(12) United States Patent
Brinkman et al.

(10) Patent No.: US 6,351,578 B1
(45) Date of Patent: Feb. 26, 2002

(54) THERMO-OPTIC SWITCH HAVING FAST RISE-TIME

(75) Inventors: Michael J. Brinkman, Redwood City; William K. Bischel, Menlo Park; Tony Kowalczyk, Palo Alto; David R. Main, Boulder Creek; Lee L. Huang, Sunnyvale, all of CA (US)

(73) Assignee: Gemfire Corporation, Palo Alto, CA (US)

( * ) Notice: Subject to any disclaimer, the term of this patent is extended or adjusted under 35 U.S.C. 154(b) by 0 days.

(21) Appl. No.: 09/369,900

(22) Filed: Aug. 6, 1999

(51) Int. Cl.[7] .............................. G02B 6/26; G02F 1/295
(52) U.S. Cl. ................................. 385/16; 385/4; 385/8; 385/40; 385/131
(58) Field of Search ................................ 385/2, 4, 8, 9, 385/10, 16, 18, 140, 901, 146, 129, 130, 131, 132, 39, 40; 359/124, 127

(56) References Cited

U.S. PATENT DOCUMENTS

| | | | |
|---|---|---|---|
| 4,635,082 A | 1/1987 | Domoto et al. | 346/160 |
| 4,753,505 A | 6/1988 | Mikami et al. | 350/96.13 |
| 4,767,170 A | 8/1988 | Mizutani et al. | 350/96.14 |
| 5,009,483 A | 4/1991 | Rockwell, III | 350/96.24 |
| 5,040,879 A | 8/1991 | Haven | 359/44 |
| 5,173,956 A | * 12/1992 | Hayes | 385/16 |
| 5,319,482 A | 6/1994 | Tsuchiya et al. | 359/110 |
| 5,418,868 A | 5/1995 | Cohen et al. | 385/16 |
| 5,544,268 A | 8/1996 | Bischel et al. | 385/4 |
| 5,623,566 A | 4/1997 | Lee et al. | 385/24 |
| 5,828,799 A | * 10/1998 | Donald | 385/16 |
| 6,208,798 B1 | * 3/2001 | Morozov et al. | 385/140 |

FOREIGN PATENT DOCUMENTS

| | | |
|---|---|---|
| EP | 0 219 069 A2 | 8/1992 |
| EP | 0 642 052 A1 | 3/1995 |
| GB | 2 215 071 A | 9/1989 |
| JP | 59 148031 A1 | 8/1984 |
| JP | 62 119517 A | 5/1987 |
| WO | 98/14826 | 4/1998 |

OTHER PUBLICATIONS

Diemeer, M. B. J., et al., "Polymeric Optical Waveguide Switch Using the Thermo–Optic Effect", *Journal of Lightwave Technology*, vol. 7, No. 3, Mar. 1989, pp. 449–453.

Haruna et al., "Thermo–Optic Effect in LiNbO3 for Light Deflection and Switching," *Electronics Letters*, vol. 17, No. 22, 29th Oct., 1981, pp. 842–844.

(List continued on next page.)

*Primary Examiner*—Hemang Sanghavi
(74) *Attorney, Agent, or Firm*—Haynes Beffel & Wolfeld; Warren S. Wolfeld

(57) ABSTRACT

A thermo-optic switch is operated in a novel near-impulse mode in which the drive pulse width is shorter than twice the diffusion time of the switch. The drive pulse width is less than the rise time of the steady-state optical response and also less than the rise time of the deflection efficiency response to the applied drive pulse. The drive pulse can further include a sustaining segment following the initial short pulse segment, if it is desired to maintain the switch in an ON state for a longer period of time. A number of additional techniques are described for further reducing the response time of the switch. An array of thermo-optic switches operated in this manner can form a display which, due to the fast individual switch rise times, can operate at an overall fast refresh rate.

67 Claims, 14 Drawing Sheets

OTHER PUBLICATIONS

Haruna et al., "Thermooptic Waveguide Interferometric Modulator/Switch in Glass", Second European Conference on Integrated Optics, Oct. 17–18, 1983, pp. 129–131.

Hida, Y., et al., "Polymer Waveguide Thermo–Optic Switch with Low Electric Power Consumption at 1.3 μm", *IEEE Photonics Technology Letters*, vol. 5, No. 7, Jul. 1993, pp. 782–784.

Lee, C.C., et al, "2×2 single–mode zero–gap directional–coupler thermo–optic waveguide switch on glass," *Applied Optics*, vol. 33, No. 30, Oct. 20, 1994, pp. 7016–7022.

Min, Y.J., et al., "Transient Thermal Study of Semiconductor Devices", *IEEE Transactions of Components, Hybrids, and Manufacturing Technology*, vol. 13, No. 4, Dec. 1990.

Nishihara, H., et al., *Optical Integrated Circuits*, Chap. 10, New York: McGraw–Hill, 1989.

Concorullo G. et al., "All–silicon–Fabry–Perot Modulator Based on the Thermo–optic Effect", Optics Letters, U.S. Optical Society of America, vol. 19, No. 6, Mar. 15, 1994.

Haruna M. and Koyama J.., "Thermo–Optic Waveguide Interferon Modulator/Switch in Glass", IEE Proceedings, vol. 131, No. 5, October 1984, pp. 322–324.

Concorullo G. et al., "All silicon–Fabry–Perot Modulator Based on the Thermo–optic Effect", Optics Letters, U.S. Optical Society of America, vol. 19, No. 6, Mar. 15, 1994.

\* cited by examiner

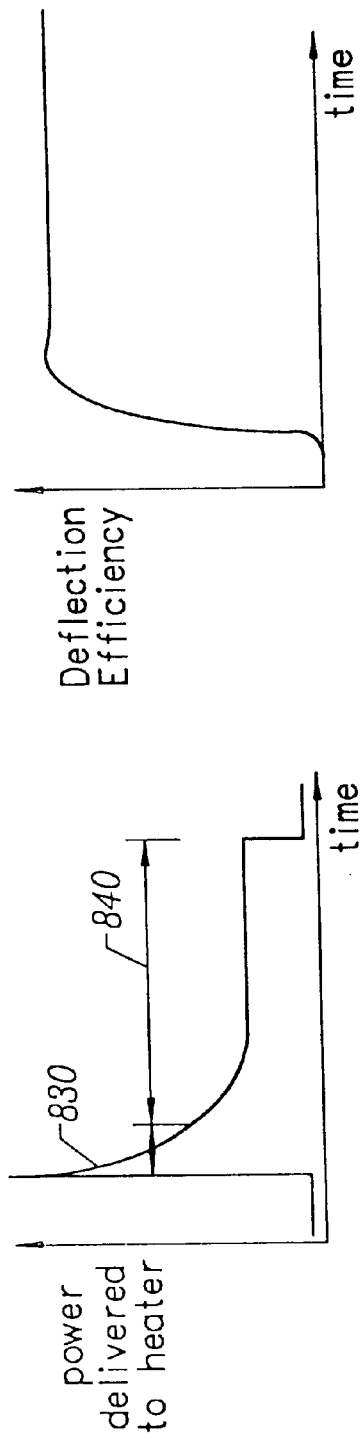

THERMO-OPTIC SWITCH HAVING FAST RISE-TIME

This invention was made with Government support under contract DASG60-96-C-0149 awarded by the U.S. Army Space and Missile Defense Command. The Government has certain rights in the invention.

REFERENCES

The following references are incorporated herein by reference:

U.S. Pat. No. 4,635,082 to Domoto et al.

U.S. Pat. No. 5,544,268 to Bischel et al.

M. B. J. Diemeer et al., "Polymeric optical waveguide switch using the thermo-optic effect", *Journal of Lightwave Technology*, vol. 7, No. 3, March 1989, pp. 449–453.

Haruna et al., "Thermo-optic effect in LiNbO3 for light deflection and switching," *Electronics Letters*, vol. 17, No. 22, Oct. 29$^{th}$, 1981, pp. 842–844.

Y. Hida et al., "Polymer waveguide thermo-optic switch with low electric power consumption at 1.3 μm", *IEEE Photonics Technology Letters*, vol. 5, No. 7, July 1993, pp. 782–784.

C. C. Lee et al, "2×2 single-mode zero-gap directional-coupler thermo-optic waveguide switch on glass," *Applied Optics*, vol. 33, No. 30, Oct. 20, 1994, pp. 7016–7022.

Y. J. Min et al., "Transient thermal study of semiconductor devices", *IEEE Transactions of Components, Hybrids, and Manufacturing Technology*, vol. 13, No. 4, December 1990.

H. Nishihara et al., *Optical Integrated Circuits*, New York: McGraw-Hill, 1989.

BACKGROUND

1. Field of the Invention

The invention relates to thermo-optic switches, and more particularly to methods and structures to achieve fast switching rise times in thermo-optic switches, primarily but not exclusively for display applications.

2. Description of Related Art

Referring to FIG. 1A, guided wave devices typically consist of an optical path defined by at least a core 115 and a cladding 110/120 that confines the optical path in two dimensions. The core layer 115 is adjacent to one or more cladding materials 110/120 that have a lower refractive index than the core. In the illustration shown, the substrate itself forms a lower cladding 120 for confinement normal to the plane of the surface, while either air or a material deposited on the core forms an upper cladding 110 to complete the confinement normal to the plane. In some glassy or crystalline materials, the core 115 of the waveguide can be formed by diffusion of an ion into a substrate, raising the index of refraction. In this case, both the core layer 115 and lower cladding 120 are part of the substrate. In other materials such as polymers, the core and cladding are typically deposited in layers, with a core layer 115 surrounded by lower 120 and upper 110 cladding layers to provide confinement for the waveguide normal to the plane. Confinement in the second dimension, the plane of the substrate, can be provided by either a difference in thickness or refractive index of a portion 135 of the core layer 115. Optical waveguides may have many forms, such as channel waveguides described above, planar waveguides and optical fiber waveguides for example.

Thermo-optic ("TO") switches may be formed using any waveguide forms including but not limited to those mentioned above. TO switches operate on the principle of a thermally-induced change in index of refraction of the optical path at a switch location. Thermo-optic devices are useful for many applications because of polarization insensitivity, the availability of low-loss thermo-optically active materials, and the absence of charging affects associated with EO devices.

As illustrated in FIG. 1A, a conventional TO device 100 typically includes a resistive heater 105 which, by injecting thermal energy through a top cladding layer 110 into the core 115, increases the temperature in the core and changes its refractive index, forming an index-modified region 125. The index-modified region acts as a switch, causing the light propagating along 130 to be diverted from the waveguide. The resistive heater 105 is shown symbolically in the figure and the switch could be any optical switch known in the art including, but not limited to, Mach-Zehnder interferometers, directional couplers, two-mode interferometers, and total internal reflection (TIR) devices. The switch is activated by applying a control signal, such as a voltage or current, to the resistive heater 105.

The prior art discloses two different regimes of operation for thermo-optic switches: one regime in which the electrical power is applied continuously to the heater so that the deflection efficiency of the switch approaches a constant steady-state value during application of the electrical power (sometimes referred to herein as "regime I" or a "steady-state regime"), and a second regime in which electrical power is applied in a drive pulse that ends before a steady-state deflection efficiency is reached (sometimes referred to herein as "regime II" or an "overdrive regime"), such that the response time of the device is approximately equal to the drive pulse width.

For the purpose of clarity, we specifically define a device to be operating in the steady state regime when the change in deflection efficiency of the device exceeds 90% of the maximum deflection efficiency change that occurs as a result of a specific control pulse for at least one-half the length of the control pulse. Contrarily, a device is specifically operating in the overdriving regime when the change in deflection efficiency of the device exceeds 90% of the maximum deflection efficiency change that occurs as a result of a specific control pulse for less than one-half the length of the control pulse, and is not otherwise operating in a third regime, the "near-impulse response regime," which is defined elsewhere in this document.

FIG. 1B illustrates the amplitude of the control signal over time for a switch operated in the steady-state regime. FIG. 1C illustrates the resulting deflection efficiency response of the switch. As shown in FIG. 1B, in steady-state operation of the switch, the control signal, for example a voltage or current, is applied to the resistive heater 105 of the TO device 100, causing the heater to inject thermal energy into to optical path, thereby increasing the temperature of the material in the optical path 130 near the resistive heater 105, forming an index-modified region 125. During steady-state excitation shown in FIG. 1C, the temperature of the core 115, as well as the low power deflection efficiency of the device, asymptotically approaches a steady-state maximum value. The deflection efficiency of a device is defined herein as the percentage of optical energy that was originally in the optical path 130 that is diverted from the optical path 130 as a result of switch activation. With reference to deflection efficiency, low power implies non-saturation of the deflection efficiency response; i.e., the index of refraction does not exceed the critical index of the device during the pulse so that the shape of the deflection efficiency response is similar to that of the index response. Once the device reaches steady-state, the deflection efficiency and thermally-induced refractive index do not change until the control signal changes. Typical switch rise and fall times reported for switches operated in the steady-state regime in a polymer material system are on the order of 0.5–9 ms.

In the second regime (II) of operation for thermo-optic devices disclosed in the prior art has been referred to as ("overdriving"), an electrical energy pulse applied to the optical heater ends before a steady state optical response is reached. FIG. 2A illustrates a control signal operating a TO switch in the overdrive regime, and FIG. 2B illustrates the deflection efficiency response. Referring to FIG. 2B, the deflection efficiency of the device operated in this regime continues to increase during the entire time that the electrical drive pulse shown in FIG. 2A is applied. The deflection efficiency never saturates so that the device never reaches a steady state; thus, the response time from the start of the drive pulse to the peak deflection efficiency is approximately equal to the pulse width. The thermo-optic response to heat pulses in this regime has been analyzed by several authors, and Nishihara et al disclose an approximate expression to calculate the transient surface temperature for pulsed operation in *Optical Integrated Circuits*, New York: McGraw-Hill, 1989. Typical switch response times reported for thermo-optic switches operated in the overdrive regime are on the order of 75–200 µs in polymer material systems.

Some applications, such as fiber-optic routers for communications signals and optical displays, require faster rise times than can be obtained with the prior art operating in the first two regimes. Commonly assigned Bischel et al. U.S. Pat. No. 5,544,268 for "Display Panel with Electrically-Controlled Waveguide-Routing", describes two-dimensional addressable electro-optical switch arrays used to provide flat panel video displays. In these devices, fast switch rise times are required in order to sequence through an entire row of switches at a rate appropriate for display applications. By incorporating the invention described herein, faster responses can be achieved compared to methods discussed in literature.

SUMMARY OF THE INVENTION

It is an object of this invention to provide a method for minimizing the rise time of a thermo-optic (TO) device while simultaneously maximizing the device lifetime. Roughly described, this object is achieved in part by operating the device in a third regime (III) of operation not before disclosed. In this regime, sometimes referred to herein as the near-impulse response regime, the drive pulse width is reduced to a value that is less than two times the diffusion time of the switch so that the drive pulse has a width that is less than the rise time of the steady state optical response and less than the rise time of the deflection efficiency response of the applied over-drive pulse. By comparison, the width of the drive pulse in the second regime is approximately equal to the response time of the deflection efficiency to the applied drive pulse. Various other techniques can also be used to help reduce the switch rise time.

In another embodiment of this invention, a sustaining pulse is combined with an initial pulse in regimes I or II, in order to extend the ON time of the device while maintaining a fast rise time and maximizing the device lifetime.

BRIEF DESCRIPTION OF THE DRAWINGS

The invention will be described with respect to particular embodiments thereof, and reference will be made to the drawings, in which:

FIGS. 8A, 8D & 8F show a series of graphs of excitation conditions along a common time base.

FIGS. 8C, 8E and 8G show the thermo-optic deflection efficiency responses produced, using an electrical drive shown in FIGS. 8A, 8D and 8F.

DETAILED DESCRIPTION

A. Overview

Figure 1A:
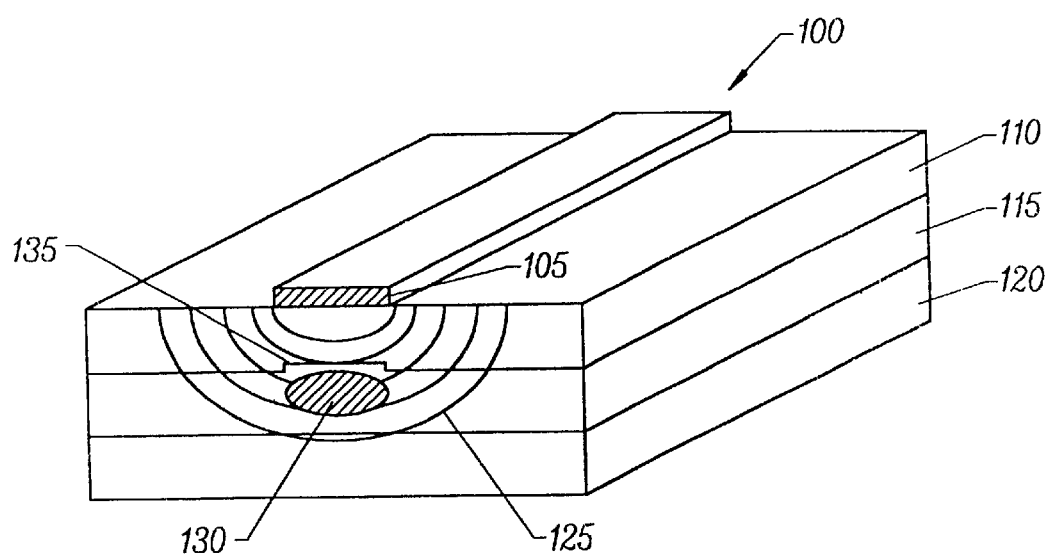
FIG. 1A symbolically illustrates a guided wave thermo-optic (TO) switch, with isothermal contours showing the temperature distribution during operation of the switch.
Figure 1B:
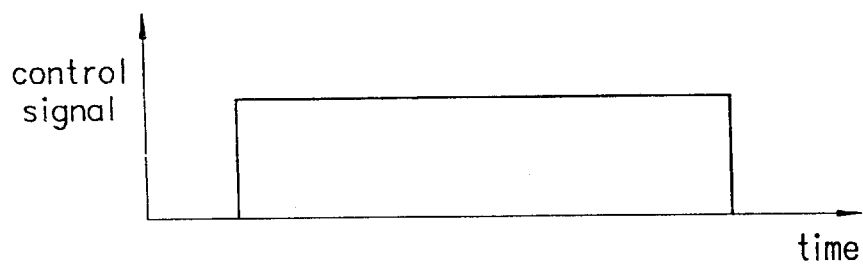
FIG. 1B is a graphical representation of an electrical energy control signal for driving the TO switch shown in FIG. 1A, in accordance with the steady-state regime.
Figure 1C:
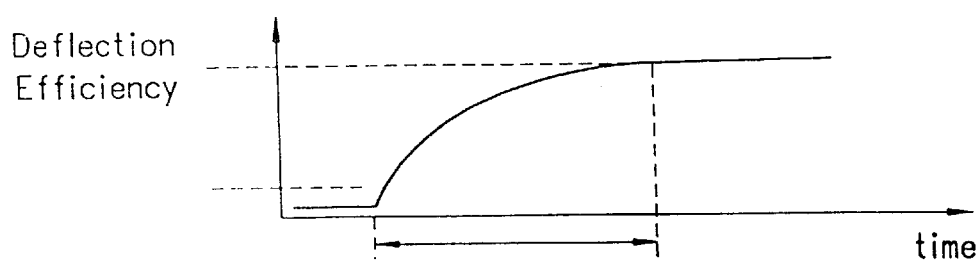
FIG. 1C shows the deflection efficiency response of the TO switch shown in FIG. 1A, in response to the FIG. 1B electrical energy control signal, in accordance with the steady-state regime.
Figure 2A:
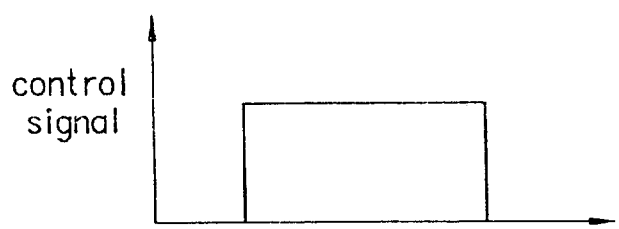
FIG. 2A is a graphical representation of an electrical energy control signal for driving the TO switch shown in FIG. 1A, in accordance with the overdrive regime.
Figure 2B:
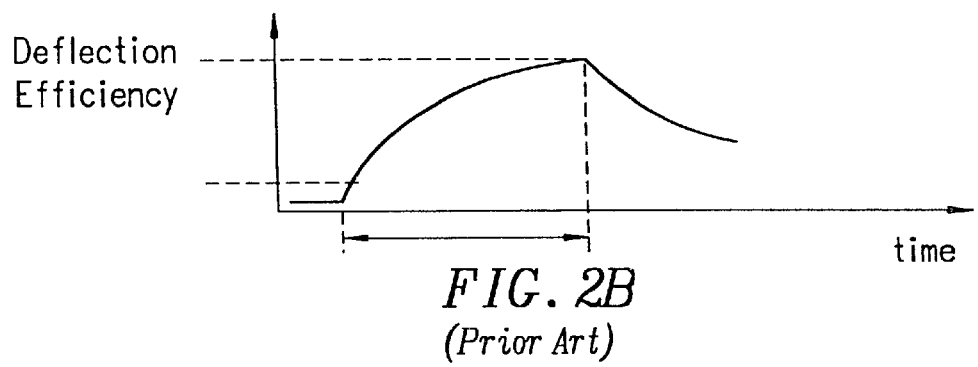
FIG. 2B is a graph of the deflection efficiency response of the FIG. 1A TO switch, in response to the FIG. 2A electrical energy control signal, in accordance with the overdrive regime.

An objective of the present invention is the creation of a very fast rise time in a thermo-optic (TO) switch device in part with the use of a specially-designed electrical drive signal, in accordance with the near-impulse regime (III) of operation for thermo-optic switches. In this regime, the drive pulse width is reduced to a value that is less than two times the diffusion time, as defined below. For a given pulse energy, this regime of operation produces the fastest rise time without stressing the device with high temperatures, thereby maximizing the device lifetime.

As used herein, the deflection efficiency of a device is the efficiency of deflection of optical energy out of a first optical path. In a two-port device, such as a modulator, the deflected energy is absorbed or otherwise lost outside the first optical path. In a three-port switch, the deflected energy may be redirected into a second optical path or to an application structure during operation of the switch. During pulsed driving of switches in regimes II or III, the change in deflection efficiency has a distinct maximum, hereby referred to as the maximum deflection efficiency change, which may be less than 100% efficiency.

The response time of a device is the time from the start of a drive pulse to the time at which the maximum deflection efficiency change occurs, in response to that drive pulse. The response time is clearly defined for devices operating in regimes II and III, although not clearly defined for devices operating in regime I, as the maximum efficiency change does not occur as a specific point in time.

The diffusion time of a device is the deflection efficiency response time of a device to an impulse drive (e.g. a delta function). Although the response time for a device depends on the length of the drive pulse, the diffusion time does not. In determining the diffusion time, the switch should be driven at a low enough energy so that the maximum deflection efficiency change can easily be determined and the switch is not operating in saturation; i.e., the index of refraction does not exceed the critical index of the device during the pulse so that the shape of the deflection efficiency response is similar to that of the index response.

The rise time of the switch is the length of time required for the switch optical deflection efficiency to change from 10% to 90% of the maximum efficiency change. As the prior art is not consistent in the distinction between usage of "rise time" and "response time," the definitions described herein are used in describing the prior art.

In the near-impulse regime (III), the drive pulse, by definition, has a width that is less than twice the diffusion time. Alternatively, regime III may be approximated by a drive pulse with a width that is measurably less than the response time (e.g., less than 90% of the response time) to the drive pulse, or by a drive pulse that is less than four times the rise time of the deflection efficiency change resulting from the drive pulse. By comparison, the width of the applied drive pulse in the second regime is approximately equal to the response time of the deflection efficiency to the applied drive pulse. In the second (overdriving) regime (II), the response time of the deflection efficiency response varies linearly with the drive pulse width, while in the third (near-impulse) regime, the rise time of the deflection efficiency response approaches a constant value (the impulse response rise time) with decreasing pulse width.

The 3-layer TO device shown in FIG. 1A has at least two ports, an input port and an output port. In the case of a single output port, the TO device is a modulator. Other embodiments include two or more output ports, and the device controllably deflects optical energy from a first optical path including the first output port, to a second optical path including a second output port. The term "switch", as used herein, is intended to cover both devices having one output port as well as devices having two or more output ports.

With reference to a typical 3-layer TO device shown in FIG. 1A, an electrical drive signal (also called a control signal) is applied to a resistive heater 105 adjacent to a cladding layer 110. In an embodiment of the present invention, the electrical drive/control signal is applied over a short period of time compared to twice the diffusion time of the thermal energy into the core layer 115 of the TO switch device. In order to make the diffusion time a measurable parameter, it is defined in terms of the deflection efficiency response change, the change in the efficiency of deflection out of a first optical path in response to a drive signal.

Figure 3A:
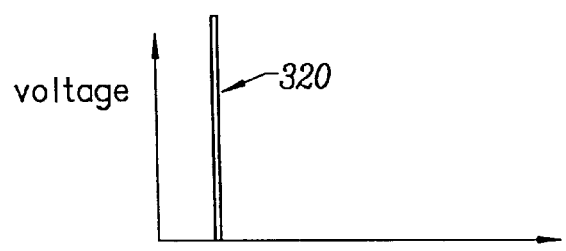
FIG. 3A is a graphical representation of an near-impulse control signal applied to the switch in FIG. 1A.
Figure 3B:
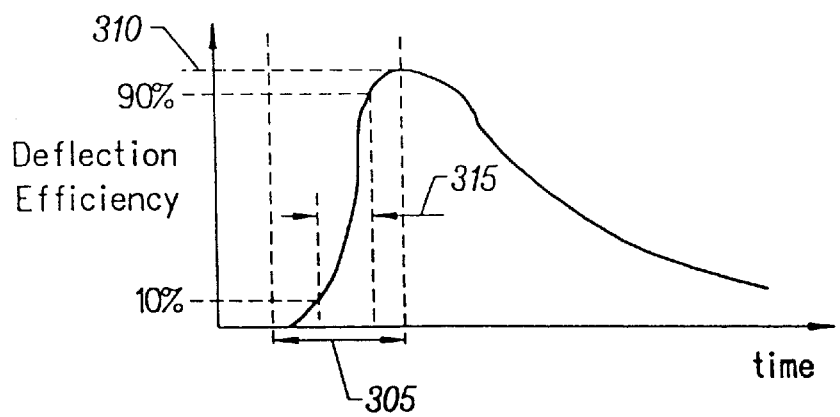
FIG. 3B is a graph of the deflection efficiency response of the FIG. 1A TO switch, in response to the FIG. 3A electrical energy control signal.

FIG. 3A illustrates a near impulse drive pulse and FIG. 3B illustrates the deflection efficiency response of a TO switch in response to the impulse. Referring to FIG. 3B, the diffusion time ($\tau_D$) 305 of a TO switch is defined to be the length of time for the efficiency to reach its maximum change 310 when driven by an impulse 320 of electrical energy as shown in FIG. 3A. An impulse signal 320 is an idealistic electrical pulse having a finite energy but a temporal pulse width that approaches zero and therefore a pulse amplitude that approaches infinity. The diffusion time is measured from the start time of the impulse drive pulse. In one embodiment of a TO switch, the diffusion time is on the order of 18 $\mu$s. The rise time 315 of the impulse response, which is measured from the time the deflection efficiency reaches 10% of its maximum change to the time that it reaches 90% of its maximum change, is on the order of 8 $\mu$s. Note that both the diffusion time and the impulse response rise time make reference to the "maximum change" in deflection efficiency. This is the maximum change that the switches will achieve in response to the applied pulse, and may be less than the maximum deflection efficiency change that the device can ever achieve. Note also that the diffusion time, as well as the impulse response rise time, are parameters of the switch structure and do not depend on the applied drive signal for a nonsaturated device.

Figure 3C:
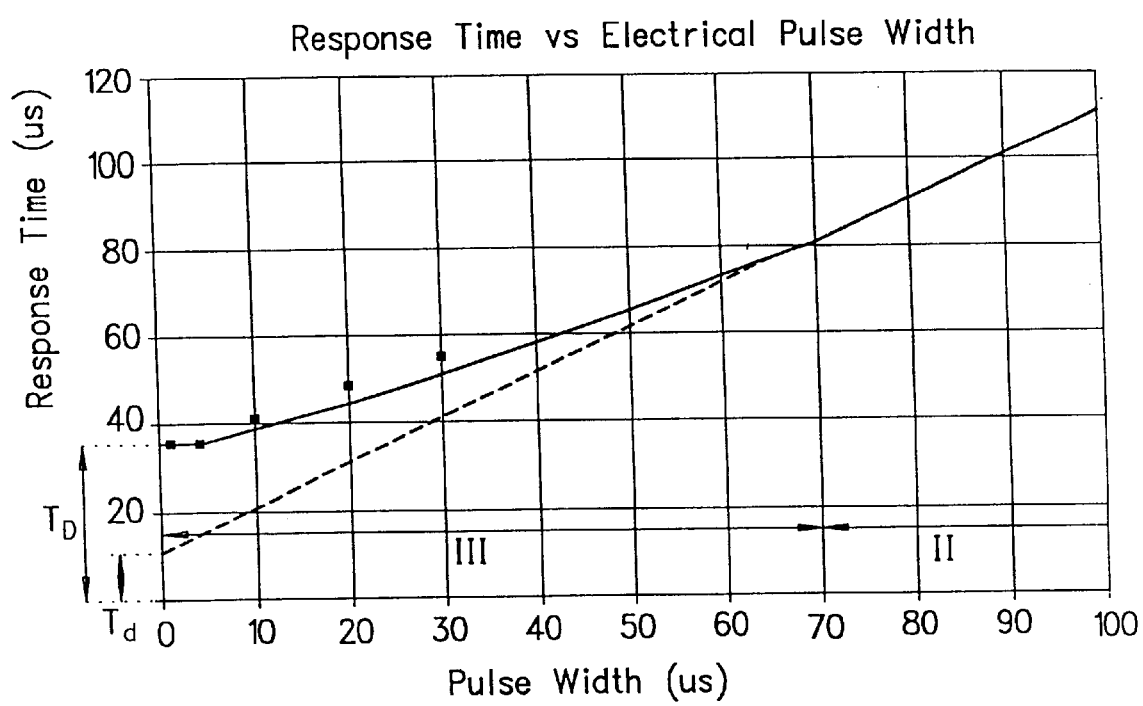
FIG. 3C is a graph of the deflection efficiency response of the FIG. 1A TO switch, as a function of the pulse width of the control signal for a TO device.

The impulse response of a device, for example, the deflection efficiency response of the switch, corresponds to the shortest possible rise time for a given energy. FIG. 3C is a plot of the deflection efficiency response time of a sample switch as a function of applied pulse width. It can be seen that the response time of the device approaches a constant value as the applied pulse width approaches zero (an impulse drive). The impulse response time of the deflection efficiency response for a TO device can therefore be estimated by driving the resistive heater with successively shorter constant-energy pulses, plotting the optical rise time, and extrapolating to the rise time for a zero pulse width. An impulse drive function can therefore be approximated by a pulse width that has essentially the same deflection efficiency response as a true impulse drive pulse. For example, the response time of the impulse response shown in FIG. 3C is 35 $\mu$s. Since the response time for the device tested does not decrease significantly for a pulse widths less than 5 $\mu$s, a pulse width of 5 $\mu$s or less can be used to approximate an electrical drive impulse for the purposes of determining diffusion time ($\tau_D$). The time from the start of this approximate impulse function to the peak efficiency of the TO device may therefore be taken as the diffusion time of the device. The impulse response rise time of the device can be determined in a similar manner, by measuring the time required for the deflection efficiency to increase from 10% to 90% of the maximum value in response to the electrical drive impulse.

Although the fastest possible rise time for a TO switch device operating at a given energy is created by applying an impulse electrical drive signal, this is not practical in a real device. For drive pulse widths that are less than twice the diffusion time (regime III), many of the advantages of an impulse drive can be achieved. Therefore, the preferred drive pulse width for the device measured in FIG. 3C is a pulse of 36 µs or less. In the regime of operation discussed, the refractive index gradients in the optical path never reach a steady-state condition. For this reason, such operation is referred to as dynamic. Although the short pulse width of the electrical drive pulse is necessary for a fast rise time, the optical switching efficiency induced by such a pulse is necessarily transient.

Faster rise times can generally be achieved for a particular pulse width by increasing the drive energy. For devices that can withstand the higher temperatures and thermal gradients associated with higher energy densities, this approach may be attractive, particularly for devices that saturate.

In the dynamic operation of a thermo-optic device, whether the deflection efficiency is increasing or decreasing with time depends on the balance of thermal energy flow into the optical path (from the resistive heater) and away from the optical path (primarily into the substrate). In response to the end of a drive pulse, the thermal energy flow from the resistive heater also terminates simultaneously; however, there is an inherent delay time ($T_d$) before the temperature in the optical path is affected. This nonzero delay time ($T_d$) results from the nature of the diffusion process, in which thermal energy flow depends on thermal gradients; even though energy flow from the heater stops, a substantial amount of energy is stored in the volume between the heater and the optical path. Referring to FIG. 3C, the response time asymptotically approaches a linear function as the drive pulse width increases into regime II. The asymptote for the response time in FIG. 3C is equal to the response time plus the delay time, which in this case is equal to 10 µs. Thus in regime II, the response time only approximately equals the control pulse width; more precisely, the response time equals the control pulse width plus the delay time. It is understood that references to this approximate relationship imply the more precise description defined herein.

The electrical drive pulse is not constrained to be a rectangular pulse with a constant amplitude. In fact, a varying-amplitude pulse may be preferred for some applications, and may be decreasing or have a dip during the pulse. The width of varying-amplitude drive pulses is defined to be the full-width at half-maximum (FWHM) of the power drive pulse, or the FWHM of the square of the control pulse. Drive pulses may have a dip that extends below the half-maximum level, providing that the length of time that the pulse amplitude is less than the half-maximum level is less than twice the diffusion time of the device. For varying amplitude pulses, an average power amplitude of the drive pulse is defined as the root-mean-square (RMS) value of the control pulse, for example a current or voltage, during the pulse width interval defined here. The pulse width and average amplitude are defined for pulses in all of the drive regimes (I, II, or III). The average amplitude of the pulse during its width is set such that the pulse energy achieves a desired deflection efficiency, preferably greater than 90%. In polymer devices with dimensions of 10 µm×300 µm as described herein for example, pulse energies less than 3 µJ are typical.

B. General Structure

Figure 4:
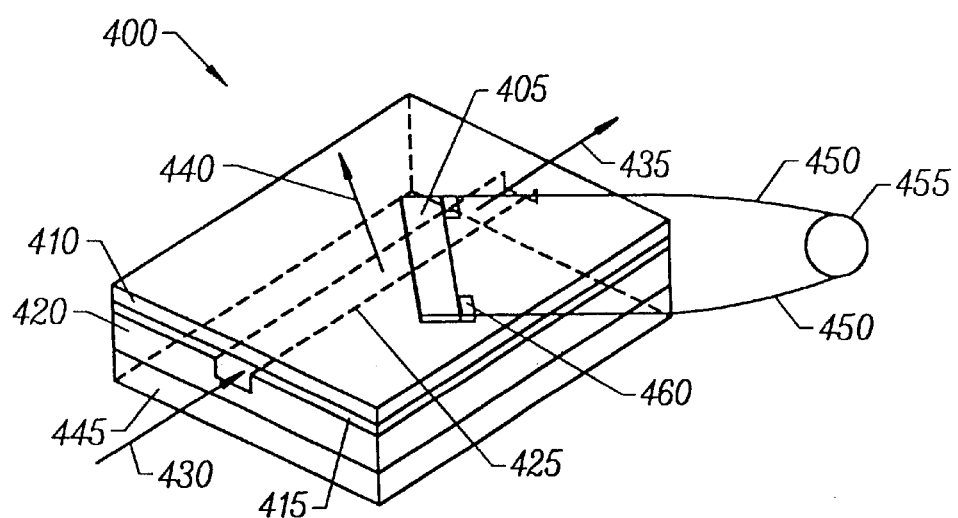
FIG. 4 symbolically illustrates a TO switch in accordance with aspects of the present invention.

FIG. 4 illustrates a switch structure which may be used to implement the invention. As shown, a device 400 consists of an optical stack and an electrical layer that creates switching in the stack. The optical stack includes a lower cladding layer 420 on a substrate 445, a core layer 415, and a top cladding layer 410. The electrical layer includes a resistive heater 405 that injects a thermal pulse into the stack, causing switching to occur, and a pair of conductors 450 that deliver electrical current to the resistive heater. The resistive heater, together with the portion of the waveguide stack adjacent the heater that has an increased temperature and altered refractive index when the thermal pulse is injected, forms the thermo-optic switch. Light enters the device through a first optical path 430, which is preferably defined by a channel waveguide 425. It should be noted that the application of a change in temperature to some materials (an increase or decrease of heat) may alter the refractive index by either causing the refractive index to increase or decrease. This alteration of refractive index is dictated not only by the choice of material, but by the architecture of the device in question. Hence in some devices, the application of heat may turn off the switch, and the removal of the heat may cause deflection to occur. As used herein, the change in deflection efficiency produced in response to a drive signal is always expressed as a positive number. If the deflection efficiency of a given TO switch increases in response to a drive signal, then the deflection efficiency change represents the amount by which the defection efficiency increases. If the deflection efficiency of a given TO switch decreases in response to a drive signal, then the deflection efficiency change represents the amount by which the deflection efficiency decreases.

Returning to FIG. 4, at the thermo-optic switch, a second optical path 440, illustrated in the same plane as the core, directs light away from the first optical path 430. When the switch is off, light travels along the first optical path 425 to the output 435 of the device; when the switch is on, light in the first optical path 425 is diverted to the second optical path 440. The portion of light that is diverted from the first optical path 425 to the second optical path 440 is defined as the deflection efficiency of the switch. Since the switch is preferably operated in regime III, the application of an electrical drive signal to the switch will turn the device on, although the switch will not necessarily be on during that application. In a similar manner, the termination of an electrical drive signal will cause a device to turn off, although the switch may be on and even increasing in efficiency after the electrical drive signal has terminated.

In the embodiment illustrated in FIG. 4, light is confined within the core layer 415 of an optical polymer stack, which is comprised of a lower cladding 420, the core layer 415, and a top cladding 410 deposited on a substrate 445. The substrate 445 may be any material of sufficient thickness to support the cladding, and may consist of polymer, glass, or a semiconductor. The lower cladding 420, optionally, may be the same as the substrate 445 and thus would not require deposition. The core layer 415 has a refractive index that is larger than both the top and lower claddings, forming a planar waveguide that confines the optical beam within the core layer 415. The thickness of the core layer 415 is set so that the waveguide preferably supports only a single mode, and the thickness of the top cladding layer 410 is set so that resistive heater 405 or any other materials deposited above the top cladding layer do not cause appreciable optical loss in the device.

The substrate 445 may comprise polymer, glass, ceramic, metal or other material with mechanical support stability that allows subsequent layers to be fabricated on the substrate. For applications requiring flexibility, polymer substrates may be preferable to rigid substrates. In one embodiment, the substrate is composed of transparent polymer. The lower cladding 520, core 525, and top cladding 530 layers are then sequentially deposited onto the substrate through a succession of spin coating and curing steps that include but are not limited to UV or thermally-induced hardening, solvent removal, and vacuum drying. Depending on the material, other means of fabricating optical stacks can be used including wet and dry roll coating or lamination. The materials are fully cured and minimally interacting such that deposition of subsequent layers does not destroy or alter the optical, mechanical, or other properties of adjacent layers. The resistive heater is deposited and patterned to the desired shape using standard photolithography techniques such as sputtering and wet or dry etching or laser ablation.

Layer thicknesses for the top cladding 410 and core 415 less than 2 $\mu$m are desirable in order to minimize the diffusion time from the resistive heater 405 to the core 415, thereby also minimizing the device rise time. Because of the need for a thin core layer 415, the refractive index difference between the core and cladding layers is preferably at least 0.02. Similarly, the desire for a thin top cladding layer puts an additional preference on the difference in refractive index between the core and top cladding to be at least 0.05 to prevent absorption or scattering of the optical mode from the resistive heater elements.

In addition to the index requirements, optimization of the stack for fast switching puts additional constraints on the materials, particularly for the top cladding 410. In particular, the rise time is approximately inversely proportional to the thermal diffusivity $\kappa = K/\rho Cp$. Therefore, a lower heat capacity $Cp$, a lower density $\rho$, and a higher thermal conductivity (K) lead to faster device rise times. With other device parameters, such as top cladding thickness, held constant, a material with the maximum $\kappa$ will minimize the rise time of a TO device.

When devices are driven with short pulses as described herein, the temperatures of the top resistive heater 405 and the top cladding 410 become much hotter than when driven with longer pulses associated with the steady-state and overdrive regimes. Thus, the top cladding 410 and resistive heater 405 must be able to withstand short, high temperature, thermal pulses without degradation of the device. The resistive heater 405 must adhere well to the top cladding 410 without delaminating, and the resistive heater film should be formed in a manner that minimizes stress in the metal layer. The top cladding 410 must be able to expand upon application of the thermal pulse without cracking or damaging the resistive heater 405.

One way to accomplish this is to use stack materials that comprise polymers such that the device is maintained and operated at temperatures above the glass transition (Tg) of at least one of the stack components. For applications where the operating temperatures are close to room temperature (23° C.), it may be desirable to use polymers with Tg's less than 0° C. When such polymers are used and operated sufficiently above their Tg they operate in a plastic regime and as such undergo minimized stress induced index anisotropies, aging, embrittlement, density/volume changes, and index changes resulting from repetitive switch excitation. It will be noted that these degradation mechanisms can occur independently or in combination, and lead to premature device failure resulting from increased optical insertion loss, delamination, or cracking.

In this embodiment it is preferential for the layers closest to the resistive heater 405, specifically the upper cladding layer 410 and preferably also the core 415, to be composed of optically transparent cross linked or cross linkable homopolymers and/or copolymers of monomers from the classes of urethane, siloxanes, acrylates, fluoroelastomers, alkenes, dienes, acrylates, methyacrylics, methacrylic acid esters, vinyl ethers, vinyl esters, oxides, and esters or perhaps other polymers that possess tailorable Tg's, optical transparency, and cross linking, with the addition of appropriate cross linking agents as required. In addition, one or more stack components may comprise non-cross linked polymers.

Placing the resistive heater adjacent to the lower cladding is a variation in the structure that produces essentially the same design. However, this embodiment changes the thermal flow patterns. If the resistive heater for a polymer device is deposited directly on a higher thermal conductivity substrate, most of the thermal energy flow will be towards the substrate, increasing the drive energy requirements for the switch to reach a given efficiency. For this embodiment, the heater would preferably be deposited on a low thermal conductivity substrate (such as Mylar or Kapton), or on a low thermal conductivity layer (such as another polymer layer) covering a higher thermal conductivity material (such as glass). This approach will reduce the required energy to drive the switch to a given efficiency, although still requiring about twice the energy of a switch having a resistive heater that is superposed only covered by a gas (such as nitrogen or air) or another low thermal conductivity layer on one side.

A waveguide is any structure which permits the propagation of optical energy throughout its length despite diffractive effects, and possibly curvature of the guide structure. An optical waveguide is defined by an extended region of increased index of refraction relative to the surrounding medium. An optical channel waveguide 425 defines the optical path 430 within the plane of the substrate and may be formed by any definition process found in the art, such as a rib, index, or strip confinement. In an embodiment fabricated in a polymer material system, the channel waveguide may be fabricated by any technique found in the art, including rib confinement with trench or top hat shapes, index-confinement, or strip confinement. Rib confinement corresponds to a thicker core layer in the region of the waveguide, possible methods of fabrication include, but are not limited to dry etching, wet etching, laser ablation, selective layer growth, or swelling. Index confinement techniques include photo definition and diffusion. In alternate material systems such as lithium niobate, diffusion processes such as annealed proton exchange (APE) or titanium in diffusion may be used. Strip confined structures consist of index differentials in a cladding layer adjacent to the core. For example, GaAs strip waveguides are made by employing layers of GaAs and AlGaAs of a lower refractive index.

It should be noted that some of the channel waveguide fabrication processes, such as diffusion in lithium niobate, serve to confine the mode in two dimensions. These channel waveguides can be fabricated within a separately-fabricated planar waveguide as described according to the preferred embodiment. However, an alternate embodiment uses the two-dimensional confinement waveguides fabricated directly in the substrate, without a separately-fabricated planar waveguide. If the core material is restricted entirely to the channel waveguide then the core layer thickness is the depth of the index perturbation that forms the waveguide. Trench structures fabricated in the substrate may also be used.

The width and effective index difference between the channel waveguide and the surrounding area are set so that preferably only a single lateral mode is supported in the channel. For waveguides characterized by abrupt index discontinuities such as those formed by rib-, trench- or strip-confinement, the mode cutoff for different modes can be calculated using the effective index method, as described by Nishihara et al in *Optical Integrated Circuits*, New York: McGraw-Hill, 1989.

For more complicated structures having graded-index profiles, a numerical calculation of the mode cutoffs is preferable using one of a number of commercially available software packages. However, while single mode operation is preferred to minimize the complexity of the device, this invention does not require it.

In general, the resistive heater 405 (FIG. 4) may be formed by any material that can be deposited in a thin enough layer to meet both the heat storage and resistance requirements of the device. In addition, the bulk electrical resistivity of the resistive heater material must also be significantly smaller, typically by at least an order of magnitude, than that of the top cladding layer 410, throughout the desired thermal operating range of the device. For example, the resistive heater could consist of metals such as aluminum, nickel, chromium, gold, titanium, copper, etc., conductive paint, conductive epoxy, semiconducting material, or optically transparent materials such as oxides of indium and tin.

The resistive heater 405 (FIG. 4) in one embodiment is formed of a resistive material like NiCr that has been deposited on the top cladding 410 using standard techniques such as sputter or evaporative metal deposition. The resistive heater 405 is patterned to the desired shape using standard processes such as photolithography, wet or dry etching, or laser ablation.

Low resistance conductor elements 450 are connected to the ends of the resistive heater 405. Preferably, the conductor material has a lower resistivity than the resistive heater material, and may for example be gold, silver, copper, or aluminum, deposited and patterned by any of the techniques known in the art. The conductor dimensions should be of sufficient size that the heat generated in the conductor due to the activating current flow is significantly lower than that generated in the resistive heater. Typically, a connector 460 is used to make electrical contact between the conductors 450 and the electrical drive circuitry 455.

The resistive heater width, which for example might be in the range of 3 to 15 $\mu$m, is set by a tradeoff between a number of conflicting desires. The desire for a low power device makes a narrower resistive heater preferable. However, lithography becomes more complex and expensive at narrow widths. In addition, narrower widths tend to require the resistive heater to be heated to a higher temperature in order to maintain a given switch efficiency, potentially decreasing the device lifetime.

An upper constraint on the thickness of the resistive heater is set by the heat storage in the resistive heater material. A large heat storage capacity in the resistive heater will cause the temperature at the surface of the device to be low, which implies a low rate of heat flow through the top cladding layer 410. In order to prevent the resistive heater dimensions from significantly impacting the rise time of the device, the heat stored in the resistive heater 405 should be significantly less than the heat stored in the top cladding 410 at a given temperature:

$$\rho_E Cp_E X_E < 0.5 \rho_{TC} Cp_{TC} X_{TC} \quad \text{(eq. 1)}$$

where $\rho_E$ is the density of the resistive heater, $Cp_E$ is the heat capacity of the resistive heater, $X_E$ is the thickness of the resistive heater, $\rho_{TC}$ is the density of the top cladding, $Cp_{TC}$ is the heat capacity of the resistive heater, and $X_{TC}$ is the thickness of the top cladding. For typical polymer materials used in the preferred embodiment, $\rho_{TC}=1.0$ g/cm$^3$ and $Cp_{TC}=1.8$ J/g ° C., giving a volume heat storage capacity of 1.8 J/cm$^3$ ° C. in the top cladding. For a typical NiCr composition, $\rho_E=8.0$ g/cm$^3$ and $Cp_E=0.45$ J/g ° C., giving a volume heat storage capacity of 3.6 J/cm$^3$ ° C. in the resistive heater. For a top cladding thickness $X_{TC}$ less than 2 $\mu$m the NiCr resistive heater thickness therefore is preferably less than 0.5 $\mu$m. Although this constraint optimizes the device, it should not be construed as a design requirement.

The choice of the resistive heater material is constrained by the desired operation voltage and current for the switch. Assuming a TIR switch that requires a drive energy density of 100 pJ/$\mu$m$^2$ to achieve efficient switching, a switch width of 10 $\mu$m, a length of 460 $\mu$m, and a drive pulse width of 10 $\mu$s, a peak drive power of 46 mW might be used. In order to operate this device at a 5 volt drive, a switch resistance of 540 $\Omega$ is required. For the switch dimensions assumed, this device resistance implies a sheet resistance $\rho_S$ of 12 $\Omega$ per square. For a NiCr resistivity of 1.8 $\Omega$ $\mu$m, a thickness of 0.15 $\mu$m meets the target, which is consistent with the maximum thickness determined previously.

The switch length depends on the type of optical device. In one embodiment, the switch is of the total internal reflecting (TIR) type, in which the electrode is laid out at an angle to the waveguide as described by Bischel et al in U.S. Pat. No. 5,544,268. In this device, the electrode length L is at least long enough to bisect the entire waveguide mode full width $2\omega_o$:

$$L \geq 2\omega_o / \sin(\theta) \quad \text{(eq. 2)}$$

where $\theta$ is the angle of incidence of the switch with the waveguide. As an example, a mode width of 4 $\mu$m and an angle of incidence of 1° require the electrode length to be at least 460 $\mu$m.

FIG. 4 symbolically illustrates a TIR switch device. In this device, the first optical path 430 is defined by a channel waveguide 425 as described herein. The second optical path 440 is not defined by a channel waveguide per se but a region in which the beam deflected by the switch travels toward an output, confined at least to the core layer by the planar waveguide structure. The output might be an out-of-plane mirror that reflects the beam out of the core, the edge of the substrate, or a pit filled with an absorbing material such as a pixel in a display. An output close enough to the switch to prevent significant divergence of the switched beam traveling along the second optical path does not require a waveguide to confine the second optical path. In particular, a waveguide that intersects the waveguide forming the first optical path is not required. This is an important aspect of devices having a large number of switches and therefore requiring a low loss per switch, as described in Bischel et al. Alternatively, some devices may utilize a single- or multi-mode confining structure along the second optical path in order to maintain a specific mode size at the output. The confining structure can be created by the same process that forms the channel waveguide on the first optical path, or it may be formed by a separate process step that creates a different index change to confine the beam.

An alternate embodiment for the fast TO switch is a directional coupler or two mode interferometer, such as that described by C. C. Lee et al, "2×2 single-mode zero-gap directional-coupler thermo-optic waveguide switch on glass," *Applied Optics*, vol. 33, No. 30, Oct. 20, 1994, pp. 7016–7022. The required electrode length for such a device is determined by the desired drive voltage. Typically, directional coupler lengths range from a few millimeters to over a centimeter.

Other embodiments for the fast TO switch include digital optical switch, Mach-Zehnder modulators, waveguide interrupters, and other optical switches that rely on a thermally-induced change in index.

C. Two-Sided Resistive Heater

Figure 5:
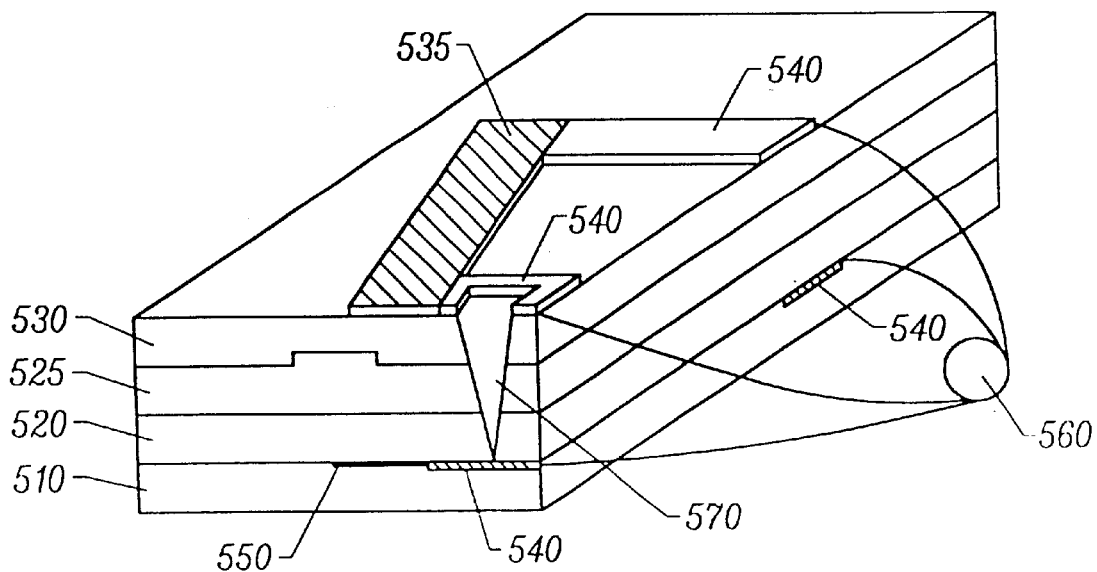
FIG. 5 symbolically illustrates a second embodiment of a TO switch in accordance with aspects of the present invention.

FIG. 5 shows another embodiment of a switch device. It comprises a substrate 510, a lower electrode 550 that is adjacent to the lower cladding layer 520 and the substrate, a core layer 525, an upper cladding 530, and an upper electrode 535.

The structure is formed by depositing a resistive metal of a desired thickness (typically about 0.1 $\mu$m for metals such as Ni:Cr) by evaporation or sputtering on the substrate (or on a low thermal conductivity layer overlying the substrate). The substrate preferably comprises of polymer, polymer-coated glass, or other thermally insulating material. It is preferable for the thermal conductivity of the substrate or thermally insulating material to be equal to or less than that of the lower cladding so that thermal energy preferentially travels into the optical stack during switch excitation. Glass, ceramic, and other rigid substrates will also suffice but are preferably coated with a polymer layer to act as a thermal diffusion barrier. In some applications the substrate may serve as the lower cladding layer. The resistive heater is patterned to the desired shape using standard photolithographic techniques such as etching or laser ablation. In the preferred embodiment the optical stack is composed of layers of transparent polymer materials. The lower cladding 520, core 525, and top cladding 530 layers of thickness 1.5 mm, 1.0 mm, and 1.5 mm respectively, are sequentially deposited onto the electrode-patterned substrate through for instance a succession of coating and curing steps as previously described. Depending on the material, other means of fabricating optical stacks can be used including spinning, wet and dry roll coating, or lamination. The materials are fully cured or minimally interacting such that deposition of subsequent layers do not destroy or alter the optical, mechanical, or other properties of adjacent layers. A metal layer is deposited on the top cladding layer 530 and patterned to the desired resistive heater 535 shape, aligned to the structures located below the waveguide.

The top and bottom resistive heaters 535, 550 are connected to electrical drive circuitry 560 that allows nearly simultaneous (or simultaneous) electrical excitation of the resistive heaters. The drive circuitry is connected to contact pads 540 located at the ends of the resistive heaters that allow individual excitation of the resistive heaters 535, 550. In addition, the contact pads 540 enhance the mechanical stability of an otherwise thin (~0.1 $\mu$m) resistive heater. Note that in general, there is no requirement that the contact pads 540 be located at "ends" of the resistive heater material, only that they be located at different positions on the resistive heater material so that current flow through the heater material will create the desired thermal patterns in the optical stack. Connection of the lower resistive heater 550 to the drive electronics is accomplished by selectively etching, ablating, or dissolving the optical stack material from regions near the contact pads 540. The resulting access holes 570 to the lower contact pads are typically referred to as electrical vias. In some applications it may be preferable to electrically connect top and bottom resistive heaters. This type of connection may be accomplished by depositing electrical bus lines that connect resistive heater ends serially or in parallel.

When the resistive heaters of FIG. 5 are excited with electrical energy, the core layer 525 experiences an increase in temperature. Compared to single-resistive heater device architectures (as in FIG. 4), a dual-resistive heater architecture may produce a higher temperature in the core layer upon switch activation, without generating excessively high temperatures at the heater-cladding boundary that would otherwise cause device failure resulting from resistive heater fracture or delamination. Specifically, the dual resistive electrode device shown in FIG. 5 will produce a higher temperature in the core when each resistive heater is energized with electrical energy E (total energy 2E) than a essentially similar single-heater device excited with a total energy E. In practice, if equal amounts of electrical energy are used to excite top and bottom resistive heaters, the top resistive heater 535 will transfer more thermal energy into the stack than the bottom resistive heater 550 because the thermal energy from the lower resistive heater 550 will also travel into the substrate 510. The ratio of thermal energy deposited into the stack compared to the substrate is approximately equal to the ratio of thermal conductivities ($K_{stack}/K_{sub}$) of the stack and substrate 510. Alternatively, additional electrical energy can be supplied to the lower resistive heater 550 to compensate for the loss of thermal energy into the substrate 510.

As previously described, a response time less than 50 $\mu$s can be achieved with a single-sided resistive heater. The alternative approach of a two-sided heater reduces the peak temperature in the polymer cladding layers, reducing the risk of premature failure mechanisms including resistive heater delamination, material embrittlement, and cracking of either metal or cladding layer. A second consequence of the dual resistive heater architecture is lower peak temperature in the cladding layers and a reduced (vertical) thermal gradient in the region between the resistive heaters which may relieve stress that causes premature aging of the optical stack materials. Reduction of these degradation mechanisms can extend device lifetime. Further benefits relating to device performance and longevity may arise from a more uniform thermal gradient across the stack layers. At a minimum, the dual electrode architecture allows lower temperatures at the resistive heater-cladding interface without compromising switch speed. As used herein, if electrical energy is said to be applied to "the heater", such language will be understood to refer to the application of electrical energy to all heaters or heater segments in the switch structure.

D. Driving the Device

Figure 6A:
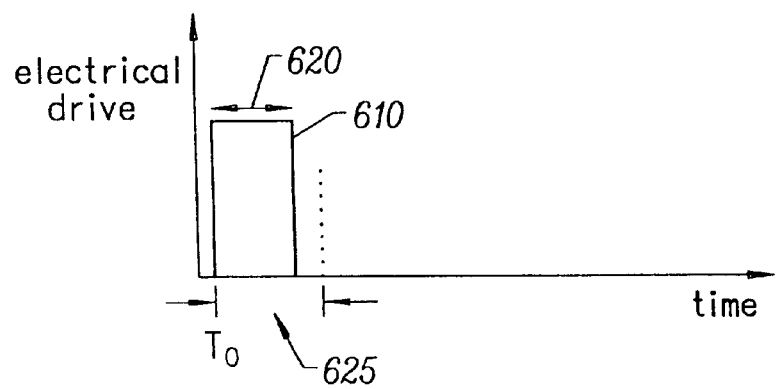
FIG. 6A is a graphical representation of an electrical drive pulse in accordance with aspects of the present invention.
Figure 6B:
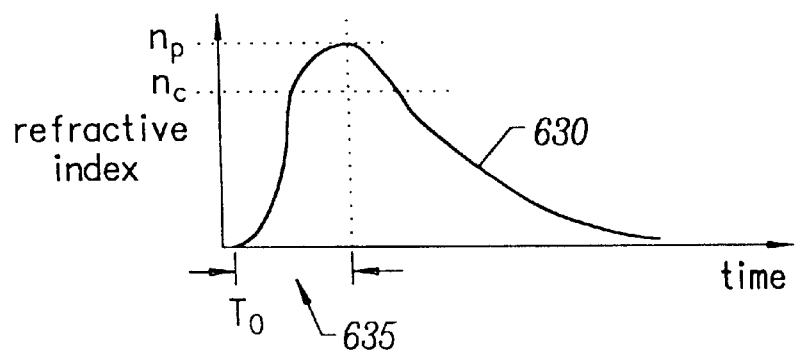
FIG. 6B is a graphical representation of the thermally-induced refractive index response expected from the FIG. 6A control pulse.

FIG. 6A illustrates an electrical drive pulse 610 beginning at a time $T_0$ and having a width 620 less than twice the diffusion time 625 of a device (for example, that shown in FIG. 4). FIG. 6B illustrates the resulting refractive index change 630 in the material when the drive pulse of FIG. 6A is applied to the resistive heater of the device. This refractive index change has a peak $n_P$ at a time period 635 following $T_D$ due to the finite width 620 of the drive pulse 610, and then decreases back to zero. Because of the narrowness of drive pulse 610, the time period 635 approaches the diffusion time 625 of the device.

Figure 6C:
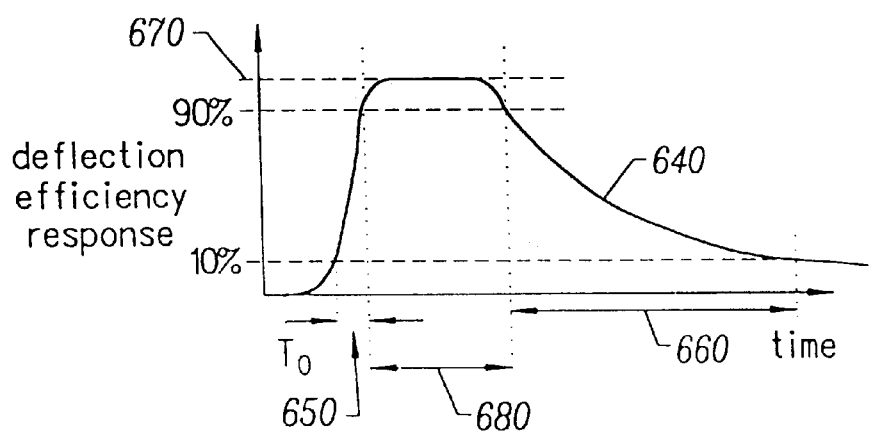
FIG. 6C is a graphical representation of deflection efficiency response of a saturated TO switch expected from the FIG. 6A control pulse and corresponding to the refractive index response in FIG. 6B.

FIG. 6C illustrates the deflection efficiency response 640 of the switch. It can be seen that the deflection efficiency in this example rises to a maximum efficiency 670, remains there for a time, then falls off asymptotically to a small value. The rise time of the switch is defined herein to be the length of time required for the switch optical efficiency to change from 10% to 90% of the maximum efficiency change. In the example of FIG. 6C, since the optical efficiency increases in response to the applied control signal, and since the optical efficiency was zero (or very small) prior to activation of the control signal, the rise time is approximately equal to the length of time 650 required for the switch optical efficiency to change from 10% to 90% of the maximum efficiency 670. The fall time 660 of the switch is defined to be the length of time required for the switch optical efficiency to change from 90% to 10% of the maximum efficiency 670. The ON time 680 is also defined in terms of the maximum efficiency, equaling the length of time that the switch efficiency is greater than 90% of the maximum value 670. Note again that the maximum efficiency 670 may or may not equal or be near to 100% in different embodiments.

Because of the nonlinear relationship between the deflection efficiency response and the induced refractive index change, the rise time of the deflection efficiency response is not necessarily the same as that of the refractive index change. In particular, increasing the energy in the drive pulse does not change the rise time of the refractive index change but does increase the peak index change and duration, and may decrease the rise time of the deflection efficiency response, due to saturation. However, due to the above non-linear relationship, the rise time for the deflection efficiency response is generally faster than that of the refractive index response.

The rise time of a device operated in regimes II or III is generally significantly less than the fall time. For example, although the device producing the plot of FIG. 3C may produce rise times consistently less than 20 $\mu$s, the fall time of the same device might exceed 50 $\mu$s. This phenomenon is believed to result from the broadening and cooling of the thermal profile after the applied pulse. Broader profiles have a lower thermal gradient, giving rise to a smaller beat flow and therefore a slower change in the thermal profile with time. Device rise times can be significantly improved using the techniques described herein, but the same techniques may not significantly impact the fall time. In one embodiment, a fast fall time is not required. In other embodiments, the fall time can be minimized with the use of a high thermal diffusivity substrate and a thin lower cladding. Examples of potential substrates, in order of increasing thermal diffusivity are polymer, glass, semiconductor, and metal. By placing the same restriction on the lower cladding as the top cladding, i.e., its index is at least 0.05 less than the core, its thickness can be reduced to less than 2 $\mu$m. It should be noted that use of a thin lower cladding and a high-diffusivity substrate may decrease the peak index change, particularly for pulse widths in regimes I and II for a given pulse width, effectively requiring more energy to drive the device to a given efficiency. For applications requiring only a fast rise time, a thicker lower cladding and lower thermal diffusivity substrate are therefore preferred.

Dynamic operation is naturally suited to devices with saturable deflection efficiency responses. For reference, FIG. 6B shows the refractive index deviation response of the switch to the electrical pulse shown in FIG. 6A. For a TIR device such as that shown in FIG. 4, the deflection efficiency increases as a function of the refractive index change in the switch, until the refractive index change is larger than a critical value $n_C$. Above $n_C$, the induced refractive index change diverts the maximal amount of optical energy from the first optical path 425 to the second optical path 430. At refractive index changes greater than this value, the deflection efficiency response does not increase further (FIG. 6C).

Although easier to realize useful operation in a saturable response device, regime III operation for driving the TO switch is extendible to devices with periodic responses with refractive index, such as mode-interference-based TO switch devices employed as directional couplers. TIR and directional coupler devices are disclosed in numerous prior art documents, e.g., Nishihara et al., *Optical Integrated Circuits*, New York: McGraw-Hill, 1989.

The TO switch device is driven by an electrical drive circuit that provides a control pulse adequately in advance of the desired ON time, in order to synchronize the switch ON time with an optical data stream traveling along the optical path. The electrical drive circuit is electrically connected to the conductor elements on the device with an electrical connection technique known in the art.

E. Electrode Loss Optimization

Any optical beam propagating along the first optical path through the switch will experience loss, and in practical devices, it is desirable that this loss experienced be less than some maximum value. The optical properties of the resistive heater element (the refractive index and optical attenuation constant), as well as the properties of the core and cladding materials, contribute to the insertion loss of the switch. In general, the optical attenuation constant for the resistive heater is higher than that of the core and cladding layers, so that the amplitude of the evanescent tail of the optical beam confined by the waveguide layers, desirably, is small at the lossy resistive heater. A low loss material, such as silver or indium tin oxide (ITO), may be used as the resistive heater material. However, the mechanical and electrical properties of these materials are not optimal, so resistive metals such as NiCr are preferably used.

The thicknesses of the core and top cladding can be chosen to tailor the amplitude of the tail of the optical beam and, thereby, to maintain the switch loss at an acceptable level. For applications requiring a large number of switches along an optical path, this level may need to be as low as 0.001 dB/switch. Preferably, the optical layers support only a single mode in the waveguide, in which case the core layer thickness is first chosen to be at (or near) the maximum value that supports a single waveguide mode, as described by Nishihara et al in *Optical Integrated Circuits*, New York: McGraw-Hill, 1989. The optical mode tail amplitude decreases exponentially in the top cladding layer away from the core, with a decay constant that depends on the wavelength of the light, the core thickness and the refractive indices of the core and cladding layers. The cladding layer thickness is chosen so that the tail amplitude at the heater element is low enough to produce a switch insertion loss that is less than the allowed level. The thickness is not made larger than necessary, as both the required electrical drive energy and the diffusion time increase with increasing top cladding thickness.

Figure 7A:
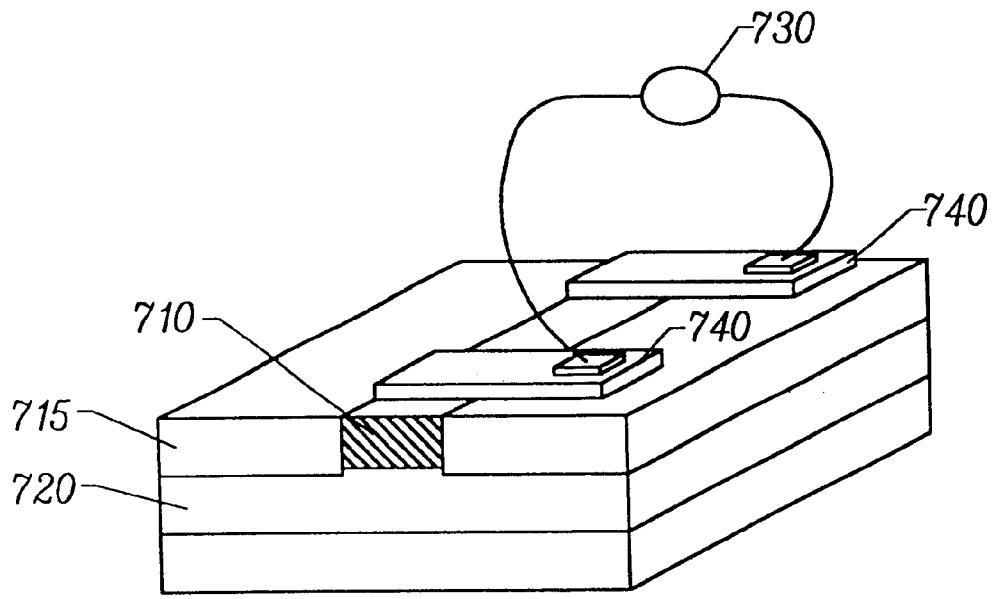
FIGS. 7A and 7B illustrate different embodiments of TO switches incorporating a cladding layer which also acts as an electrically conductive layer.
Figure 7B:
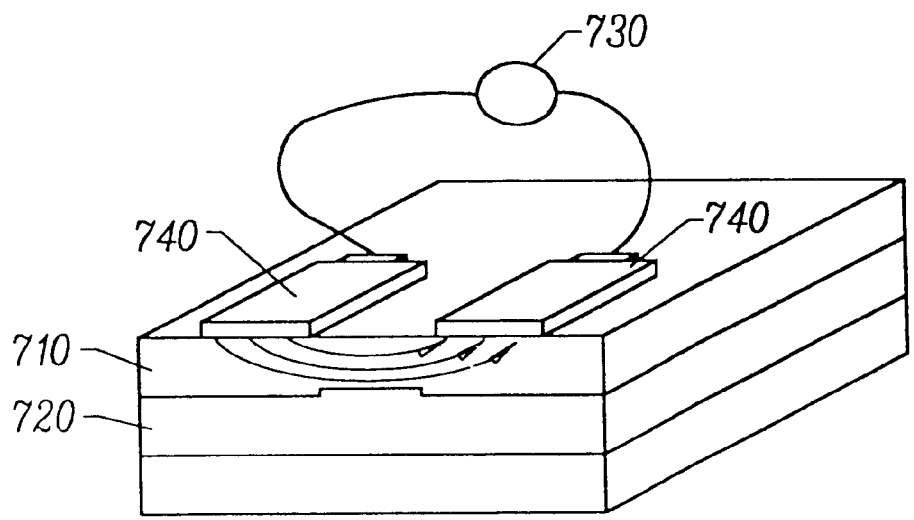

FIG. 7 illustrates another aspect of the invention in which an electrically conductive polymer cladding layer, with electrical conductivity nominally between 1.0 and 2000 Ohm-cm, functions simultaneously as an optical buffer layer (optical cladding) and a heating element. Referring to FIG. 7, the conductive polymer 710 is deposited onto the core layer 720 to a nominal thickness of 1.0 μm. The thickness is selected to achieve the desired resistance for a given switch area and polymer resistivity. The resistive heater may have electrodes connected to the two ends along its length (FIG. 7A) or across its width (FIG. 7B). The metal layer 740 is deposited on the conductive polymer 710 and patterned to control the location of current flow though the conductive polymer 710. The metal electrodes are made sufficiently thick such that they do not act as significant resistive heating elements themselves when energized. A current source 730 is connected to the electrodes 740 such that current flows between the electrodes 740 and through the polymer 710. This design produces a TO switch with response times faster than similar devices with resistive heaters in a separate layer different from the top cladding because the heating element, in this case the conductive polymer cladding layer, is closer to the middle of the core layer 720. For example, in the embodiment shown in FIG. 4, the upper resistive heater 405 is separated from the center of the core 415 by approximately 2.0 μm. In a similar structure, FIG. 7, comprising a conductive cladding layer 710, the separation between the center of the conductive cladding layer and the center of core layer is only about 1.0 μm.

Referring to FIG. 7A, a strip of conducting polymer intended for use as a heating element with the dimensions 1.0 μm×10 μm×300 μm and resistivity of 0.1 Ohm-cm has a resistance of 3×10$^4$ Ohm along its 300 μm length. In order to confine the flow of current along the length of the switch, the electrically conducting polymer is patterned by a process such as reactive ion etching, laser ablation, or wet chemical processing, for example by lithographically patterning the conductive polymer material to the dimensions of the desired resistive heater. In this case, a second top cladding layer 715 may be deposited to at least partially planarize the region in between the resistive heaters. This second top cladding material could be the same non-electrically-conductive materials used to create the top cladding 410 shown in FIG. 4.

Referring to FIG. 7B, the conductive polymer may also remain in a continuous layer, with the electrode placed adjacent to each side of the resistive heater rather than each end. In this case, the dimensions of the conductive polymer heating element are defined by the volume of polymer through which current flows and not necessarily the physical dimensions of the polymer layer. The strip of conducting polymer with the dimensions 1.0 μm×10 μm×300 μm and resistivity of 0.1 Ohm-cm has a resistance of 33 Ohm across its 10 μm width.

Figure 7C:
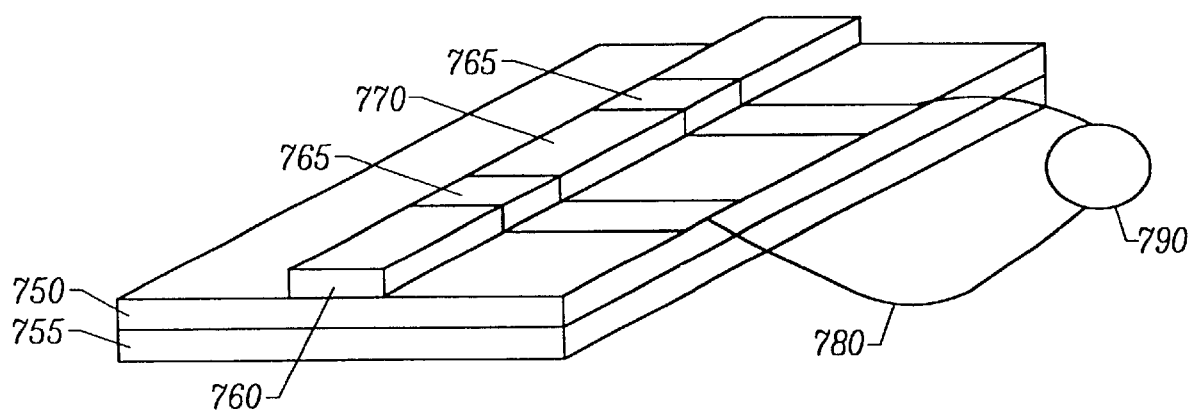
FIG. 7C illustrate an embodiment of a TO switch in which the at least a portion of waveguide core functions as a heating element also.

In yet another aspect of this invention an electrically conductive transparent polymer functions as a waveguide core and heating element simultaneously, as illustrated in FIG. 7C. In this embodiment an optical buffer or cladding layer 750 with electrical conductivity substantially less than the conductive polymer core material is deposited on the substrate 755 by spin-coating to a thickness of a few microns. The electrically conductive polymer core layer is then preferably spin-coated to a nominal thickness of 1.0 μm on the lower cladding layer. The conductive polymer is patterned, for example using a combination of photolithography and reactive ion etching processes to form channels or waveguides of conductive polymer 760. The dimensions of the core layer are preferably selected to achieve a desired resistance for a predetermined switch length, illustrated in FIG. 7C by 770.

Electrical contact to the resistive heater 770 is preferably made with a conductive metal such as Au, Ag, NiCr or oxide such as indium-tin-oxide, which is deposited for example by evaporation or sputtering onto the core and lower cladding structure, and patterned using a combination of photolithography and wet-etching to form electrical bus lines 765 that are ultimately used to deliver current to portions of electrically conductive polymer core layer. It is preferable for the electrical bus lines to be sufficiently thick and wide to prevent resistive heating of the bus lines during switch operation. The electrical connecter may consist of two materials, one (such an indium tin oxide) having a lower optical loss that is adjacent to the core layer, and a second having high electrical conductivity to minimize electrical power loss in delivering the electrical drive power to the resistive heater. A non-electrically conducting top cladding material (not shown) may be deposited on the stack at a thickness to provide optical isolation and mechanical protection.

When energized, the control element 790 delivers current via the electrical connections 780 to the electrical bus lines 765, thus causing current to flow through a portion of the conductive polymer waveguide core (resistive heater, 770) located between the electrical bus lines. The resistive heater portion 770 experiences a change in temperature upon electrical excitation and optical energy propagating in the waveguide core experiences a change in refractive index upon traveling through the activated core region.

An alternate embodiment of the device illustrated in FIG. 7C may be fabricated by depositing an electrical conductor layer above the top cladding layer. In this case, at predetermined regions in proximity to the core layer, top cladding material is selectively removed using laser ablation or reactive ion etching to form electrical access vias through which the electrical conductors connect to the electrically conductive core layer. It is preferable to fill the vias with a separate electrically conductive material, for example another polymer that is nearly index matched to the cladding layer to minimize perturbative effects (scattering and absorption) caused by an electrode-waveguide proximity as discussed earlier.

These designs produce thermo-optic switches with response times faster than similar devices that require transport of thermal energy through a cladding or other layer to produce a desired response (for example FIG. 4), since the heat is generated directly in the optical path.

Conductive polymers such as polyaniline, polythiophene, polypyrrole or other polymers with conductivity between 1.0 and 2000 Ohm-cm are examples of transparent conducting polymers that may potentially be suitable for this application because they may allow devices to be powered with reasonable voltages. For example, if 1000 switches each having a resistance of 30 K-Ohm were driven in parallel, the resistance per switch column would be 30 Ohm/column. Applying a voltage of 54V to the electrode would result in 100 W of peak power for the column. It will be noted that material properties of a polymer such as refractive index can be tuned for a desired application by blending conductive polymer into a nonconductive polymer host to obtain a combination of target conductivity and refractive index values. Increasing the concentration of conducting polymer will increase the conductivity of the polymer blend. Other benefits of this conductive polymer approach include better stack adhesion resulting from reduced coefficient of thermal expansion mismatch between the conductive polymer and core polymer layer (compared to a resistive heater-polymer interface) and potentially reduced optical insertion loss in device architectures where the activating electrode is no longer in proximity to the waveguide. Note that the next layer below the electrically conductive polymer layer, whether it be the core layer 720 or some intermediate layer, should be electrically insulating (or should at least be so much less conductive than the electrically conductive polymer as to render the resistive heating effect of any electric current in this layer negligible).

It will be appreciated, therefore, that either the core layer or a cladding layer can double as a resistive heating element of a TO switch. It will be appreciated further that for some embodiments, both the core and cladding of an optical waveguide can double as resistive heating elements.

F. Sustaining Pulse Segment

Figure 8A:
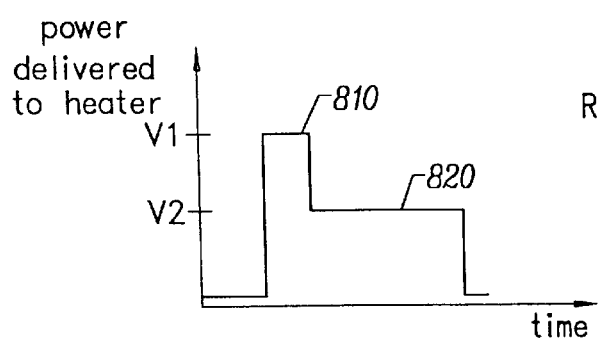

For applications such as displays that require switching of bursts of optical information within the response time of the switch, the short optical switch response associated with a narrow electrical drive pulse may be adequate. However, many applications require both a fast rise time and a longer ON time than can be achieved with a short drive pulse. It is therefore another aspect of this invention to achieve such a response by combining an initial short drive pulse segment with a sustaining pulse segment, preferably of lower average amplitude than the short drive pulse segment. The peak temperature of a device driven in this manner is significantly lower than if the full amplitude of the initial pulse were maintained, thereby maximizing the lifetime of the device. FIG. 8A illustrates such a drive signal. For the signal shape shown, the initial pulse segment is 810 and the sustaining pulse segment is 820. As the term is used herein, the sustaining pulse segment begins immediately at the end of the initial pulse segment and may last for any length of time, although the drive signal may initially be zero immediately after the initial pulse segment ends.

Figure 8B:
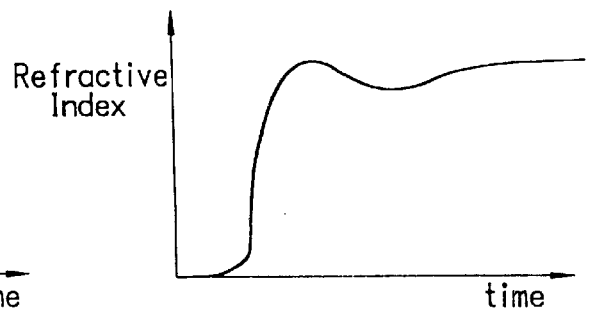
FIG. 8B shows the index of refraction response corresponding to the excitation conditions shown in FIG. 8A.
Figure 8C:
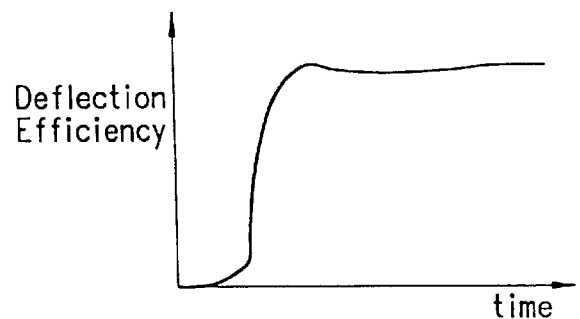

A typical index response for the drive pulse in FIG. 8A is shown in FIG. 8B. As can be seen, the index response may contain dips because of the non-optimal drive pulse shape. For a device operated for saturation in the ON state such as, for example, a TIR switch, the deflection efficiency response dips may be lessened in amplitude, as shown in FIG. 8C. If the dip in the index response does not go below the critical index value that saturates the deflection efficiency, then no dip in the deflection efficiency will be observed. If the dip does go below the critical index value, then the deflection efficiency response will have dips similar to those shown in FIG. 8B.

This segmented-pulse drive technique (which may include a combination of pulses) is most advantageous for initial pulse segment widths in the near-impulse regime (III); however, significant advantages in device speed can also be achieved from short initial drive pulse segments that are somewhat longer, in the overdriving regime (II).

Figure 8H:
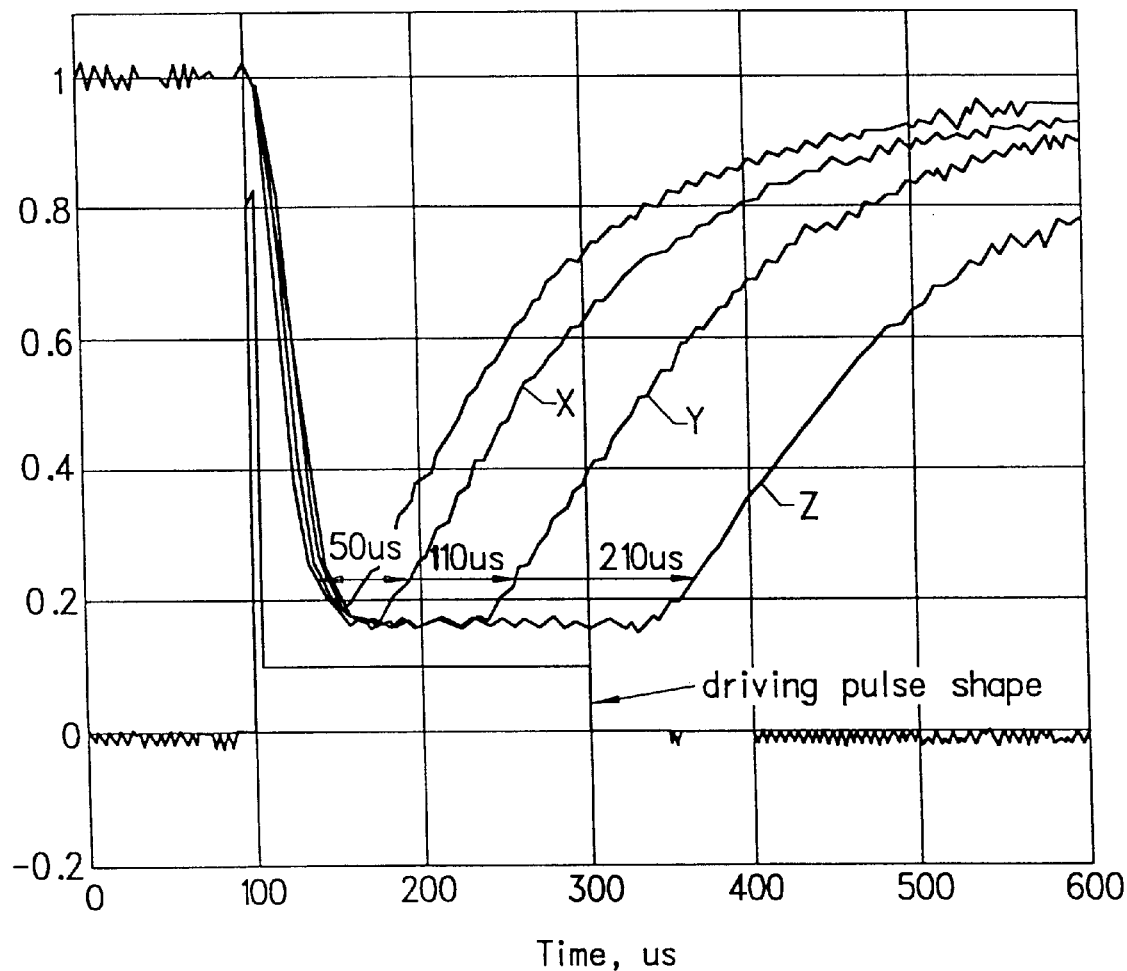
FIG. 8H shows the deflection efficiency response measured for a device driven with several different sustaining pulse widths, using an electrical drive similar to that shown in FIG. 8A.

FIG. 8H illustrates the deflection efficiency of a sample TIR TO switch driven with such a segmented-pulse technique. X, Y and Z are deflection efficiency response curves for three different sustaining pulse widths: 40 µs for X, 100 µs for Y, and 200 µs for Z. In all three cases, the initial pulse segment has a width of 10 µs. In order to minimize a dip after the initial pulse, it is desirable to have a steadily-decreasing thermal energy addition from the short initial pulse segment, such as by lengthening the decay time of the initial pulse segment. FIG. 8D, for example, shows a drive pulse having an initial segment 830 which, after a quick rise, decays exponentially to the start of the sustaining segment 840. This pulse has a fall time defined herein to be the length of time for the instantaneous amplitude of the pulse segment to fall from 90% to 10% of the difference between its maximum during the initial pulse segment and the RMS average amplitude during the sustaining pulse segment. The overshoot and temporal variations in switch efficiency can be minimized with a drive pulse that smoothly decays from an initial amplitude to a steady-state amplitude, as shown in FIG. 8D, producing the deflection efficiency response shown in FIG. 8E. In order to achieve an optimally flat switch efficiency response, the decay constant should be approximately equal to the steady-state rise time associated with the sustaining pulse segment, and the ratio of the initial amplitude to the steady state amplitude adjusted to flatten the deflection efficiency response. As before, the control pulse can be divided into an initial pulse that creates a fast rise time and a sustaining pulse that creates a long ON time. The separation between the two pulse segments is the point at which the amplitude of the pulse is midway between the initial amplitude and the sustaining pulse amplitude. The pulse width of the initial pulse segment still preferably has a width short enough to cause the device to operate in regime III. Alternately, a non-exponentially decaying electrical control pulse may be used to maintain the device deflection efficiency (or refractive index response) at a constant level throughout the sustaining pulse period.

In an alternative embodiment, the sustaining function can be achieved with a periodically-varying amplitude. For example, as shown in FIG. 8F, the sustaining pulse segment 860 may consist of a series of pulses (which might be thought of for the purposes of this description as "subpulses") that are individually approximately the same shape and amplitude as the short initial pulse segment 850, but appropriately spaced to reduce the variation in the refractive index response during the sustaining pulse to an acceptable level (FIG. 8G). The sustaining drive pulse has an average power amplitude 865 that is maintained during the pulse in order to achieve a specific deflection efficiency. In a case in which the sustaining function is accomplished with one or more "sub-pulses", the "sustaining pulse segment", as that term is used herein, is intended to end together with the last time in a given switching episode that the drive signal returns to zero or to some other non-switched value. As above, the "sustaining pulse segment" is considered to begin immediately after the initial pulse segment even where, as in FIG. 8F, the drive signal is zero immediately after the initial pulse segment ends.

G. Fast Thermo-Optic Switch Operating in a Display

Figure 9:
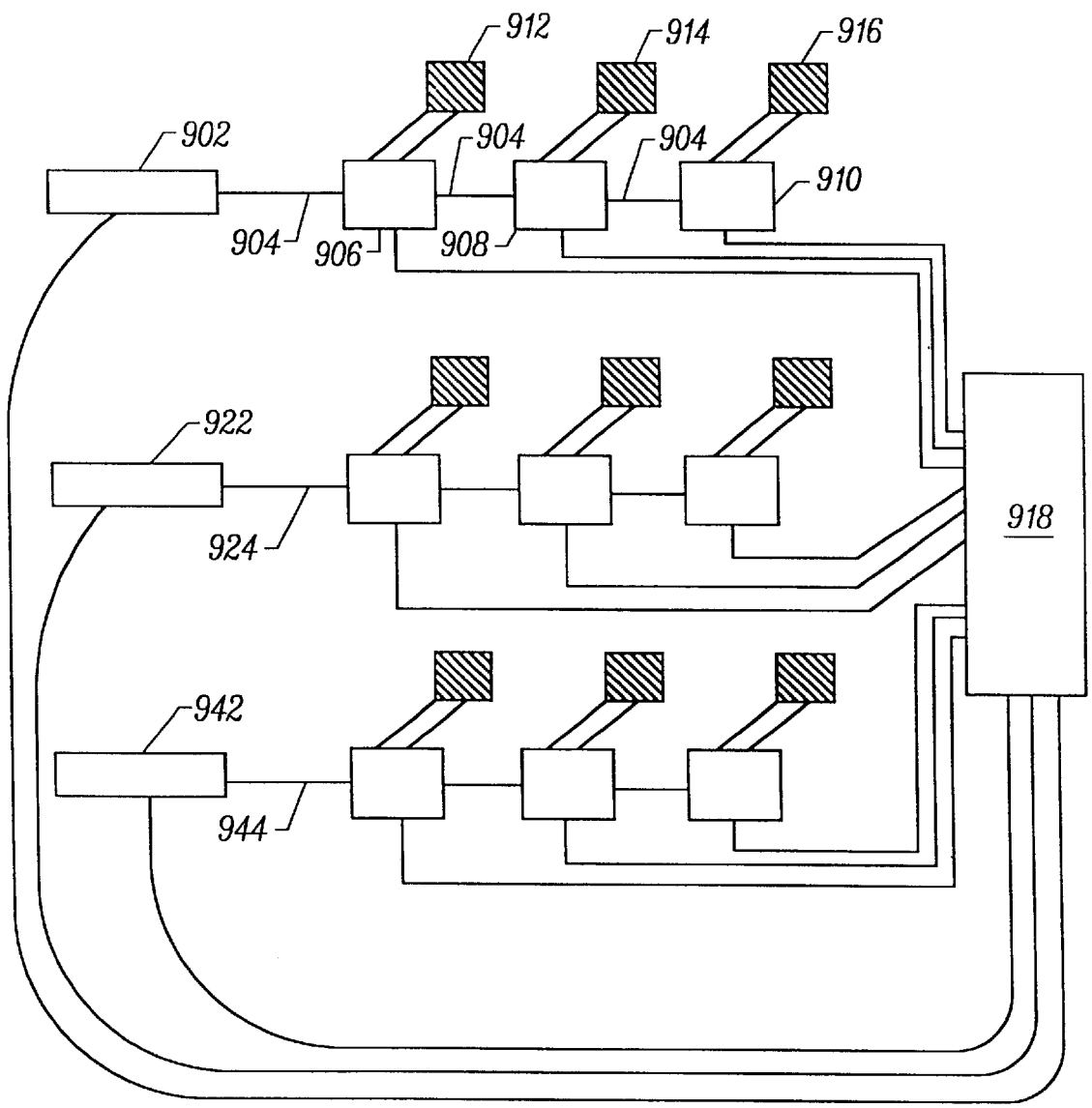
FIG. 9 illustrates a portion of a visual display device which employs a matrix of TO switches incorporating aspects of the invention.

FIG. 9 illustrates a portion of a visual display device according to features of the present invention, which employs a matrix of optically energized display elements, shown here as a 3×3 array of discrete segments arranged in columns and rows, with each row of display elements and respective diverting devices disposed along an optical path. In this embodiment, the array has a set of three optical paths, paths 904, 924 and 944. Each optical path is capable of allowing energy from a respective optical energy source 902, 922 or 942 to be propagated along the optical path when the optical diverting devices in the path are in their full-off states. In the embodiment illustrated, the optical paths are defined by respective optical waveguides which have their own independent optical energy sources 902, 922 and 942. However, in an alternate embodiment, the optical paths may be supplied by a single optical energy source.

The diverting devices serve to divert energy from the optical path and thus depending upon the nature of the application may compromise diverters, deflectors, diffractors, directional couplers, Mach-Zehnder interferometers, refractors, reflectors, switches, switched absorbers or switched detectors, and are not limited to the examples of diverting devices described above. In an embodiment of the invention, the visual display may comprise two or more layers of these matrix arrays, thus forming a three dimensional visual display.

In this arrangement, the optical energy is propagated from an upstream position, for example an energy source 902, to a downstream position along the optical path 904, through each of the diverting devices 906, 908 and 910 in sequence. In this manner, energy can be diverted to application structures 912, 914 and 916 respectively, for example, the display elements or pixels of a display. In order to facilitate the asserting of turn-on and turn-off signals for the diverting devices, a controller 918 is provided which controls each of the diverting devices or switches 906, 908 and 910, such that each can be switched on at a predetermined time in a predetermined sequence. In an embodiment, the circuitry can be implemented in a single control logic to provide such operation. Preferably, each column of switches is connected together so that one switch in each waveguide is activated simultaneously. Preferably also, the controller 918 modulates the sources 902, 922 and 942 with image data in a manner that is timed properly relative to ON times of the optical switches.

The controller 918 asserts the appropriate control signal to the switch in question, specifying that the switch should turn itself "on", and the switches, in response to the turn-on signal, divert energy from the primary optical path at a finite time thereafter. Depending upon the type of switch utilized, the assertion of the control signals may be carried on separate conductors, such that the assertion of one of such control signals may involve increasing the voltage or current on the appropriate conductor from a low level to a high level, or vice-versa. In an embodiment in which the turn-on and turn-off control signals are carried on the same conductor, the assertion of one of such control signals may involve increasing the voltage or current on that conductor from a low level to a high level, while assertion of the other of such control signals may involve decreasing the voltage or current on that conductor from a high level to a low level. In the latter case, assertion of the turn-on control signal is synonymous with negation of the turn-off control signal, and vice-versa.

In the arrangement shown, assuming that each device has a faster rise time compared to its fall time, the controller 918 switches the devices on in upstream sequence, allowing downstream switches to turn off gradually and harmlessly as each more upstream switch is turned on.

By using the techniques described herein, the controller 918 controls the diverting devices 906, 908 and 910 in a manner which optimizes the turn-on speed that is attainable by the individual switching devices. The desired drive pulse widths depend on the frame rate, the number of columns in the display, and the blanking time per frame. Specifically, the drive pulse widths are preferably less than one-half the column time, where the column time is defined to be:

$$\text{Column time} = \frac{\left(\frac{1}{\text{frame rate}} - \text{blanking time per frame}\right)}{\text{No. columns scanned per frame}}$$

Stated another way, if pulses are delivered to the various columns in sequence, each i'th one of the pulses beginning at a respective time interval $T_i$ after the beginning of the immediately preceding pulse, then the pulse width of the drive pulses should be sufficiently short that the switch rise time is less than $T_{(i+1)}/2$. This can be achieved with pulse widths that are shorter than $T_{(i+1)}/2$. Preferably the switches are driven in regime III of operation in accordance with the invention in order to achieve the fastest possible rise time for the switches, thus minimizing cross talk between switches and maximizing the available ON time.

Thus, for a display with 200 columns scanned and operating at a 50 Hz frame rate, with a blanking time per frame of 2000 $\mu$s, the drive pulse width is therefore preferably less than 45 $\mu$s. A short initial pulse segment meeting this constraint may be combined with a sustaining pulse segment, in order to achieve a uniform deflection efficiency during the available time for switching a particular column. Also, short drive pulses that are approximately equal in duration to the column time may be used without a sustaining pulse, if either the rise time of the deflection efficiency is sufficiently less that one-half the column time such that the device is operating in the steady state regime or the diffusion time is greater than the column time (in which case the display proceeds to the next column before the sustaining pulse can have an impact).

For example, in an embodiment in which the rise time is shorter than the fall time, the controller 918 asserts control signals to the switches 906, 908 and 910 by turning on the switches sequentially in a direction that is opposed to the direction of propagation of energy. That is, switch 910 is switched on before 908, and 906 is switched on after 908. When switch 910 is turned on, the energy that is propagating along 904 travels through switches 906 and 908 and is eventually diverted into the application structure 916 by optical switch 910, while it is in the ON state and prior switches are in the off state. Without waiting until switch 910 is turned completely off, that is, without waiting for the fall time to pass, the controller sends the appropriate instruction for device 908 to be turned on. Hence, optical switches 908 and 910 both may be effectively in their on-states, but not necessarily both in the full-on state, at the same time. When this instruction has been carried out, energy propagating along optical path 904 travels through switch 906 and is diverted into the application structure 914 by switch 908, and does not reach switch 910. In this case, it is assumed that in the full-on state, 100 per cent of the optical energy is diverted. In reality, a small amount of the energy may be propagated along to diverting device 910. In this manner, one does not have to wait until a switch has reached its off state before switching the next switch on, and thus a fast scanning speed/rate can be attained. Once all of the switches have been switched in this manner and sufficient time has elapsed that all switches in the row including switch 906 is in its off state, energy can once again propagate along optical path 904 all the way to switch 910, the sequence may then begin again, starting with the switch at the end farthest from the energy source 902. Depending upon the fall time of the optical diverting devices used, it may be necessary to not only wait for sufficient time to elapse for the switch 906 to turn off, but also for sufficient time to permit substantial energy propagation along the optical path 904, such that most of the switches along the path are in the full-off state. Switching this particular architecture in this sequence allows the scanning speed of the diverting devices to be faster than that which is attained if the switching operation is initiated in a sequence from switch 906 closest to the energy source 902, to switch 910 farthest from the energy source. This architecture and the associated switching method also enables sequential switching to occur without waiting for each previously scanned switch to return to its off state.

In another embodiment, the controller may be able to assert the turning on of the next switch at the same time as asserting the turning off or the sustaining pulse of the current switch. In this manner, the next switch reaches its on state before the previous switch reaches its off state, and efficient energy transfer is maintained. The timing required (including drive pulse widths and delays between driving successive switches) to obtain such efficiency is dependent upon the relative rise and fall times associated with the switching arrangement in question, the switch's ability to divert energy when between the predetermined full-on and full-off states, and the requirements imposed by the application in question. In this particular case, the scanning direction is considered to be in the reverse direction of the energy propagation, and is determined by the direction in which the assertion of the turn-on signals for the switches is carried out.

H. Electrical TO Switch Pulse Shape and Drive Circuit

Figure 10A:
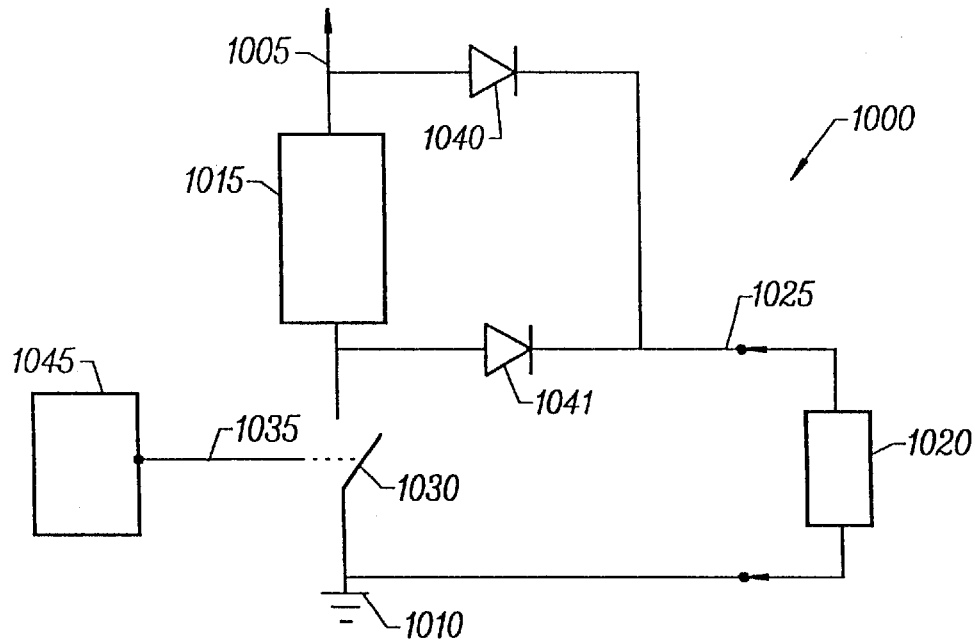
FIGS. 10A and 10C are schematics of electrical drive circuits used to generate the electrical drive pulse signals according to aspects of the invention.

In order to achieve a sustained switch efficiency with a fast rise time, a special circuit design which generates a control signal such as that shown in FIG. 6D can be used. Preferably, the control signal is periodically replicated for applications such as a display. FIG. 10A shows a pulse generator circuit 1000 that produces such a pulsed signal. The components shown in the figure are intended to be schematic rather than specific components. The circuit contains an energy storage device 1015, an electrical switch 1030 that controls the state of the energy storage device 1015, a control input line 1005, and an electrical output line 1025. A thermo-optical drive circuit 1020 is connected between the electrical output line 1025 and the energy return path 1010. The electrical switch maybe a bipolar transistor, a field effect transistor, relay, SCR, or any other electrical switch with a turn on time that is less that the desired charging time for the energy storage device. A voltage is applied across the control input line 1005 and ground 1010. Miscellaneous additional components such as resistors that control current flows, time constants, and electrical overshoots are not shown in the figure. The energy storage device 1015 is preferably an inductor; however, other energy storage devices may also be used, for example, electrical storage devices such as capacitors, transmission lines and tank circuits. In the case of a capacitor storage device, the circuit is connected differently than shown in the figure, according to known switched capacitor circuit techniques. The value of the inductor is chosen to achieve a particular time constant L/R, where R is the load resistance in the thermo-optic drive circuit 1020. The optimal time constant is chosen according to the desired optical response of the optical heater as discussed previously.

During operation of the device, a control signal generated by a controller 1045 is applied to the control line 1035 connected to the electrical switch 1030 that controls the state of the energy storage device 1015. When the electrical switch is closed (conducting), current begins to flow through the energy storage device 1015, thus charging the device. The term "charging" corresponds to a storing of energy in the element 1015 which increases with time (1=Vt/L, where t is the charging time). The storage process is nearly a conservative one, in which the only energy losses are due to minor imperfections in the components. This charging concept is important because it is of operational significance that an inductor charged with a voltage (or a capacitor charged with a current) does not degrade system efficiency: all energy is productively utilized. The energy stored is $(LI^2)/2$ and $(CV^2)/2$ for inductors and capacitors respectively. It is also significant that the charging does not require any "infinite" currents or voltages. During charging, the value of the input voltage (Vcc) appears at the output line 1025. An energy flow controller 1041 such as a diode allows the voltage at the bottom end of the energy storage device 1015 to be reduced below the value on the output line 1025. When the energy storage device 1015 has adequate stored energy to produce the desired output pulse amplitude, the electrical switch 1030 is opened (rendered non-conducting) and current flows from the energy storage device 1015 through the energy flow controller 1041 to the output line 1025. In the case of an inductor (and some other storage elements) the stored energy must be immediately released when the charging period ends to avoid energy losses. Current flows from the energy storage device 1015 to the thermo-optical drive circuit 1020 as long as the product of the current and load resistance is greater than the control input line 1005. An energy flow controller 1040 such as a diode allows the voltage on the output line 1025 to be greater than the input DC voltage line 1005. The net effect of the drive circuit 1000 is to produce a DC voltage at the output line 1025, with a voltage spike from the energy storage device 1015 which decays while it discharges. The amplitude of the voltage spike is controlled by the value (e.g. inductance) of the energy storage device 1015, the length of time that the electrical switch 1030 is closed between pulses, the charge voltage, switch impedance and the applied voltage. This approach enables the use of a low voltage supply to deliver a large amount of energy in a short amount of time. The peak voltage delivered by this circuit can be significantly larger than the supply voltage, depending on the charging time, inductance, the series resistance of the inductor circuit, and the load resistance.

The input DC voltage line 1005 creates the sustaining pulse segment. The same circuit can be used to generate only the spike without the sustaining pulse segment if the current flow controller 1040 is replaced with an open circuit. Thus, essentially the same pulse generator circuit 1000 can be used to generate either a fast-rise electrical drive pulse for switch operation in regime III or a two step drive pulse that consists of a fast-rise pulse segment and a sustaining pulse segment.

The periodic pulsed signal can be created in other ways as well. For example, the pulse shown in FIG. 8A could be generated by a switching circuit with two or more different voltage levels, such as that shown in FIG. 10C. Note that the sustaining supply can be connected using a diode instead of a switch. In this example, two voltage sources 1005, 1006 set the two voltage levels 810, 820 for the generated pulse. Two electrical switches 1031, 1032 connect the input voltage to the output control line 1025. A control signal from the controller 1045 is applied to control line 1036 to drive electrical switch 1031 to generate the first part of the pulse, while a second control signal is applied to the control line 1037 to drive electrical switch 1032 to generate the sustaining portion of the drive pulse. The control signals are synchronized such that the electrical switch 1032 turns on after 1031 turns on and preferably at the same time that electrical switch 1031 turns off, and electrical switch 1032 turns off after electrical switch 1031 turns off. Additional voltage sources and switches may be added to approximate the idealized drive pulse 830 shown in FIG. 8A.

There are several alternate means by which the pulses shown in FIGS. 8A and 8C may be created. One such way is with a digital pulse synthesizer that drives an amplifier. The digital pulse synthesizer might consist of memory that stores two or more digital amplitude values, a controller that sequentially addresses the amplitude values, a D/A converter that converts the digital signals to a variable output voltage, and a power amplifier that converts the low power analog signal into an output signal capable of supplying the desired output voltage to drive the TO switches. Another way of creating such pulses is by making a multilevel pulse by switching the primary windings of a transformer, each with a different turns ratio to produce a different drive level.

Figure 10B:
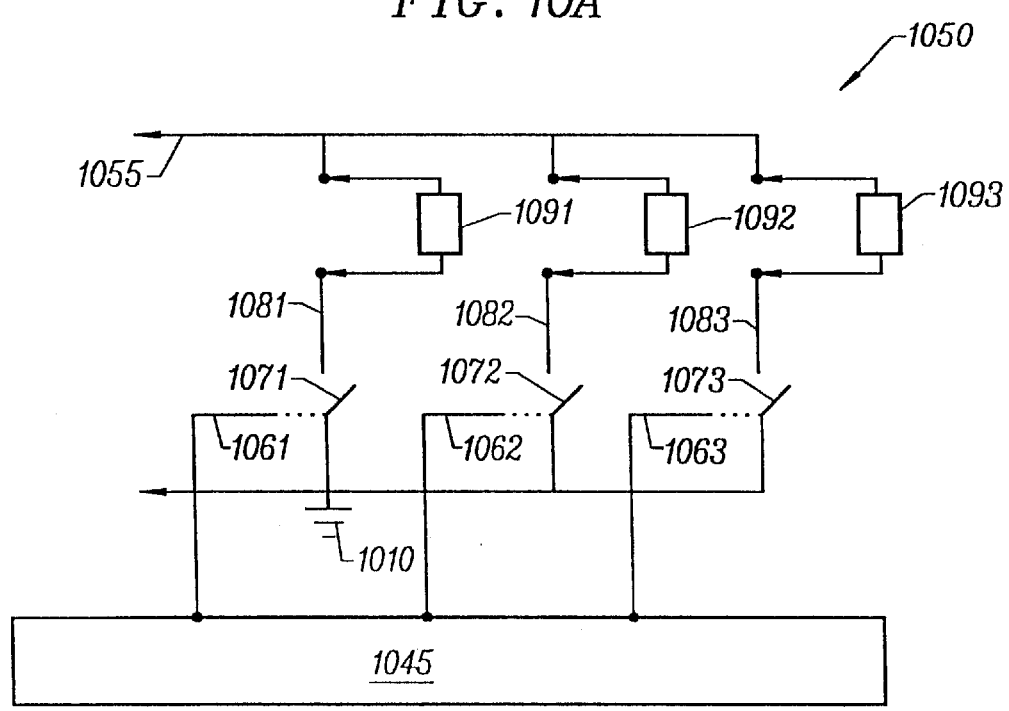
FIG. 10B is a schematic of a electrical switch array connected to the electrical drive circuit of FIG. 10A or 10C.
Figure 10C:
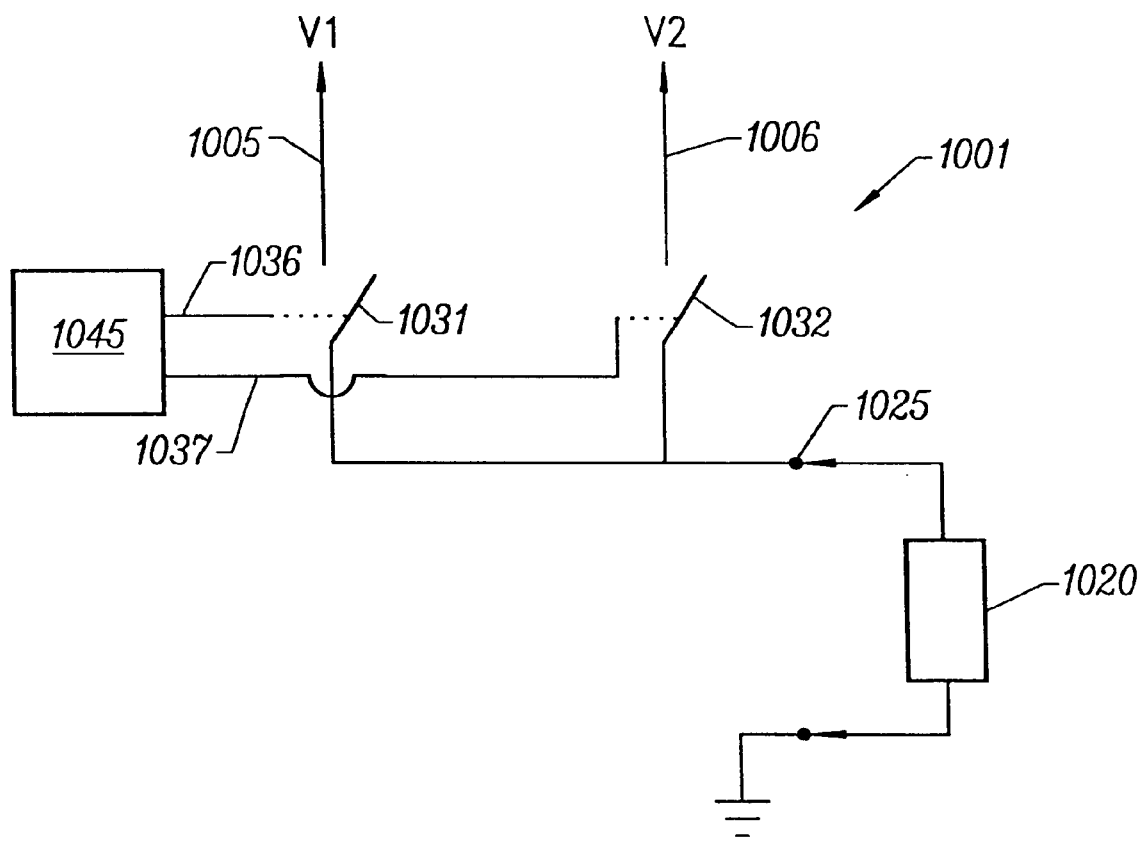

The pulsed drive signal shown in FIG. 8F could also be generated using a circuit similar to that shown if FIG. 10C, but with only a single voltage source 1005, a single electrical switch 1031, and a single control signal 1036. In this case, the control signal 1036 turns on the electrical switch 1031 multiple times at predetermined intervals, with each successive pulse occurring sufficiently before the switch efficiency falls below an unacceptable level.

As a further alternate means for approximating an idealized drive signal such as that shown in FIG. 8A, the amplitude of the drive pulse may be set by a feedback loop. For example, an amplifier circuit can generate the correct output voltage 1025 to maintain the optical switch 1020 at a particular deflection efficiency. When the drive pulse begins to be applied, the output voltage 1025 goes to a maximum level; once the deflection efficiency reaches a target value, the output voltage decreases. Note that unless the varying voltage drive comes from the natural decay of an LR or RC circuit there will be energy lost. A variable output voltage power supply is not conservative with energy, but rather throws energy away in order to produce the proper output level. An LR derived pulse is energy conservative because no energy (except minor losses due to small component imperfections) is thrown away as waste heat.

Feedback may also be used to create the pulsed drive signal shown in FIG. 8F. In order to turn on the switch initially, a first drive pulse with a particular width is applied to the device, causing the deflection efficiency to achieve a desired maximum level. Once the deflection efficiency falls below a specific minimum level, a second drive pulse with a particular level is triggered. Multiple drive pulses continue until it is desired to turn the TO device off. The particular pulse widths may be predetermined or may also be set by a feedback loop. In the latter case, each drive pulse terminates when the deflection efficiency achieves the desired maximum level. Numerous other circuits can be used to generate the desired drive pulse shape.

FIG. 10B shows symbolically an electrical switch array circuit 1050 that is preferably used as the thermo-optic drive circuit 1020 in FIG. 10A or 10C. The output control line 1025 of the pulse generator circuit 1000 is connected to the input control line 1055 of the electrical switch array circuit. An electrical control signal generated by controller 1045 is connected to the switch control circuit input 1061 for electrical switch 1071. When electrical switch 1071 is closed, the voltage between the input control line 1055 and ground 1010 is applied across thermo-optic switch heater element 1091; when electrical switch 1071 is open, current does not flow to the heater element 1091 and the power delivered to that heater element is zero.

Additional electrical switches 1072 and 1073 may also be connected to additional thermo-optic switches 1092 and 1093. Similarly, electrical control signals may be connected to switch control circuit inputs 1062 and 1063 for electrical switches 1072 and 1073. These electrical switches deliver power to the thermo-optic switch heater elements 1092 and 1093 when opened and closed as described above for electrical switch 1071.

Figure 11:
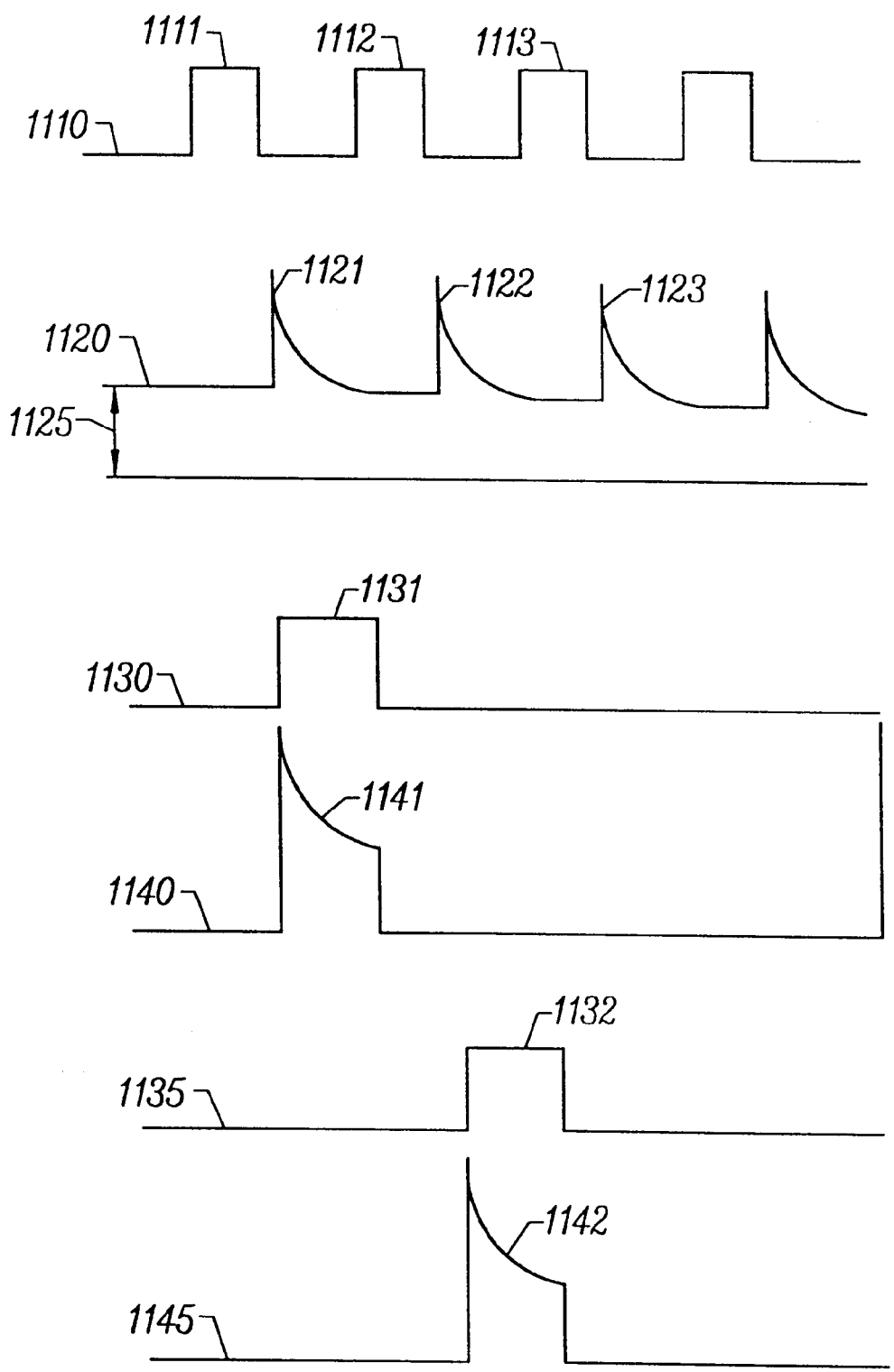
FIG. 11 shows voltages and electrical current flow in certain circuit components in FIG. 10A in the generation of the drive pulse shown in FIG. 8D.

The drive signal for electrical switch 1071 is synchronized with the drive signal for electrical switch 1030. The relationship between these drive signals in shown in FIG. 11. The drive signal 1110 is applied to the control line 1035 for electrical switch 1030. The drive signal consists of a series of pulses, during each of which the energy storage device 1015 is charged, and after each of which the energy storage device 1015 is discharged, providing the higher voltage decaying spike 1121. The circuit can be driven with a series of pulses 1111, 1112, 1113 to produce a series of spikes 1121, 1122, 1123. If the current flow controller 1040 is not an open circuit, then the baseline voltage 1125 is approximately equal to the supply voltage applied to the control input line 1005.

In the electrical switch array circuit, a control signal 1130 is applied to the control line input 1061. A pulse 1031 in the control signal connects the input control line 1055 of the electrical switch array circuit to the output 1081. This pulse is timed to select the higher voltage decaying spike 1121 to generate a drive pulse 1141 for the thermo-optic switch. This means that the turn off of the control pulse 1131 applied to the pulse generator circuit 1000 is approximately coincident the turn on of the control pulse 1131 applied to the electrical switch array circuit 1050. It should be noted that this approximation, it is preferred that the turn on of the control pulse 1131 applied to the array circuit 1050 occur before the turn off of the control pulse 1131 applied to the generator circuit 1000—i.e., a "make before break" relationship. If a sustaining pulse segment is desired, then the pulse 1131 remains on for a desired time period after the signal 1120 decays to voltage level 1125. Otherwise, it can be turned off when the signal 1120 decays to voltage level 1125. A second pulse 1132 in a second drive signal 1135 can be used to select a second higher voltage decaying spike 1122 to generate a second drive pulse 1142 for a second thermo-optic switch. Selection of different pulses is shown. Alternatively, the same pulse 1121 may instead be selected to be applied to both outputs 1081 and 1082.

This electrical switch array circuit may be used to drive an array of thermo-optic switches in the manner described above. For example, the switch array may be part of a display consisting of a two dimensional array of thermo-optic switches as described in Bischel et al. U.S. Pat. No. 5,544,268 for "Display Panel with Electrically-Controlled Waveguide-Routing". The switches may be connected in columns so that an entire column of the display is activated at the same time. In this case, heaters represented by switches 1091, 1092, 1093 are columns of thermo-optic switch heaters in the display, rather than individual heaters. Only a single pulse generator circuit 1000 is required to generate the pulses required to generate the decaying pulses required for the entire display. The control signals 1130, 1135 are preferably timed to sequentially select the series of pulses generated by pulse generator circuit 1000 to sequentially drive the columns in the display, thus scanning all of the columns across the display.

It will be appreciated that if one were to view the pulses applied to only two of the optical switches along one of the optical paths in the display, one would observe one subset of the pulses from the pulse generating circuit being applied to one of the optical switches and a different subset of the pulses from the pulse generating circuit being applied to the other of the optical switches. In fact, one would observe pulses being applied to these two optical switches alternatingly. Further, if one were to view the pulses applied to three of the optical switches along one of the optical paths in the display, one would observe pulses from the pulse generating circuit being applied in a round robin sequence to the three optical switches. Specifically in an upstream scanning embodiment, one would observe the pulses being applied to these three optical switches in a repetitive upstream sequence. Similarly, if one were to view the pulses applied to four of the optical switches along one of the optical paths in the display, one would observe pulses from the pulse generating circuit being applied in a round robin sequence to the four optical switches, again more specifically in a repetitive upstream sequence, and so on.

Although only one pulse generator circuit 1000 is required, in some cases it may be desirable to have more than one. For example, the time between activation of thermo-optic switches or display columns may be less than the desired charging time in the control pulse 1111 plus the decay time of the voltage spike 1121. In order to achieve a longer charging time, subsequent drive pulses 1141, 1142 may be connected to separate pulse generator circuits. In the case of two pulse generator circuits, voltage spikes for the even columns in the display may be generated by the first pulse generator circuit, and voltage spikes for the odd columns in the display may be generated by the second pulse generator circuit. For a display with a large number of columns, it may be desirable to have multiple pulse generator circuits, each connected to every third column, every fourth column, etc. As additional pulse generator circuits are added, the current demand on the power supply is smoothed. This means that the average current from the power supply becomes more nearly the peak current and, with this smaller variation in current levels, power supply filtering and EMI problems are reduced. Therefore, multiple pulse generator circuits will help to reduce highly variable loading on the power supply, decreasing the risk for supply instability and RF radiation.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for controlling a first thermo-optic switch for temporary deflection of optical energy out of a first optical path, said first thermo-optic switch having a heater and further having a deflection efficiency which changes in response to electrical energy delivered to said heater, comprising the step of delivering an electrical energy pulse to said heater, said pulse having a pulse width which is shorter than 90% of the response time with which said deflection efficiency reaches a maximum change after said pulse begins being applied to said heater.

2. A method for controlling a first thermo-optic switch for temporary deflection of optical energy out of a first optical path, said first thermo-optic switch having a heater and further having a deflection efficiency which changes in response to electrical energy delivered to said heater, comprising the step of delivering an electrical energy pulse to said heater, said pulse having a pulse width which is measurably shorter than the response time with which said deflection efficiency reaches a maximum change after said pulse begins being applied to said heater.

3. A method according to claim 2, wherein the deflection efficiency of said first thermo-optic switch increases in response to electrical energy delivered to said heater.

4. A method for controlling a first thermo-optic switch for temporary deflection of optical energy out of a first optical path, said first thermo-optic switch having a heater and further having a deflection efficiency which changes in response to electrical energy delivered to said heater, said first thermo-optic switch further having a diffusion time given by the length of time for the deflection efficiency of said switch to reach a maximum change in response to an impulse of electrical energy delivered to said heater, comprising the step of delivering an electrical energy pulse to said heater, said pulse having a pulse width which is shorter than twice the diffusion time of said first thermo-optic switch.

5. A method according to claim 4, wherein the deflection efficiency of said first thermo-optic switch increases in response to electrical energy delivered to said heater.

6. A method according to claim 5, wherein optical energy deflected out of said first optical path is directed into a second optical path.

7. A method according to claim 5, wherein optical energy deflected out of said first optical path is directed toward a pixel of a display.

8. A method according to claim 5, wherein said pulse is rectangular.

9. A method according to claim 5, wherein said pulse has a pulse rise time and a pulse fall time which is longer than said pulse rise time.

10. A method according to claim 9, wherein said pulse has an exponential decay.

11. A method according to claim 5, for controlling a plurality of thermo-optic switches along said first optical path including said first thermo-optic switch, each of said thermo-optic switches having a respective heater and further having a respective deflection efficiency which increases in response to electrical energy delivered to the respective heater, each given one of said thermo-optic switches further having a respective diffusion time given by the length of time for the deflection efficiency of the given switch to reach a maximum change in response to an impulse of electrical energy delivered to the heater of the given switch, comprising the step of delivering to each of said heaters in sequence, a respective electrical energy pulse having a respective pulse width which is shorter than twice the diffusion time of the respective thermo-optic switch.

12. A method according to claim 11, wherein all of said pulse widths are equal.

13. A method according to claim 5, wherein said electrical energy pulse has an average amplitude, further comprising the step of, immediately after said step of delivering an electrical energy pulse to said heater, delivering sustaining energy to said heater for a period of time which is longer than said pulse width, said sustaining energy having an average amplitude which is smaller than said average amplitude of said pulse.

14. A method according to claim 5, further comprising the step of repeating, at constant time intervals, said step of delivering an electrical energy pulse to said heater.

15. A method according to claim 5, wherein said heater comprises a plurality of heater segments.

16. A method according to claim 15, wherein said heater segments are connected in series.

17. A method according to claim 15, wherein said heater segments are connected in parallel.

18. A method according to claim 5, for controlling a first plurality of thermo-optic switches each disposed to temporarily deflect optical energy out of a different respective optical path, said first plurality of switches including said first thermo-optic switch, each of said switches in said first plurality of switches having a respective heater, comprising the step of delivering said electrical energy pulse to each of said heaters.

19. A method according to claim 5, for controlling a plurality of sets thermo-optic switches including said first thermo-optic switch, each of said switches in said plurality of sets of switches having a respective heater, wherein within each given one of said sets, each of the switches is disposed to temporarily deflect optical energy out of a different respective optical path, comprising the steps of:
  delivering said electrical energy pulse to the heaters of all of the switches in a first one of said sets and not the heaters of the switches in a second one of said sets; and subsequently
  delivering a subsequent electrical energy pulse to the heaters of all of the switches in said second one of said sets.

20. A method according to claim 5, wherein the deflection efficiency of said first thermo-optic switch is saturable, such that the deflection efficiency change in response to electrical energy delivered to said heater has a saturation value,
  and wherein said maximum change in deflection efficiency of said first thermo-optic switch is equal to said saturation value of the deflection efficiency.

21. A method according to claim 5,
  wherein said first thermo-optic switch comprises an optical waveguide having a core region and at least a first cladding region, said first cladding region having substantially greater electrical conductivity than said core region,
  and wherein at least a portion of said heater comprises at least a portion of said cladding region.

22. A method for controlling a first thermo-optic switch for temporary deflection of optical energy out of a first optical path, said first thermo-optic switch having a heater and further having a deflection efficiency which changes in response to electrical energy delivered to said heater, said first thermo-optic switch further having an impulse response rise time given by the length of time for the deflection efficiency of said switch to change from 10% to 90% of its maximum change in response to an impulse of electrical energy delivered to said heater, comprising the step of delivering an electrical energy pulse to said heater, said pulse having a pulse width which is shorter than four times the impulse response rise time of said first thermo-optic switch.

23. A method for controlling a first thermo-optic switch for temporary deflection of optical energy out of a first optical path, said first thermo-optic switch having a heater and further having a deflection efficiency which changes in response to electrical energy delivered to said heater, comprising the step of delivering an electrical energy pulse to said heater, said pulse having a pulse width which is shorter than 50 $\mu$s.

24. A method for scanning a plurality of thermo-optic switches along a first optical path, each of said switches having a respective heater and deflecting optical energy out of said first optical path in response to electrical energy delivered to said heater, each of said switches having a respective deflection efficiency, comprising the step of delivering a respective electrical energy pulse to the heaters of each of said switches in sequence, each i'th one of said pulses except a first one of said pulses beginning at a respective time $T_i$ after the beginning of the immediately preceding pulse, each i'th one of said pulses having a respective pulse width which is sufficiently short to cause the deflection efficiency of the respective switch to change from 10% to 90% of its maximum change in response to the respective pulse, within a time period of $T_{(i+1)}/2$.

25. A method for scanning a plurality of thermo-optic switches along a first optical path, each of said switches having a respective heater and deflecting optical energy out of said first optical path in response to electrical energy delivered to said heater, each of said switches having a respective deflection efficiency, comprising the step of delivering a respective electrical energy pulse to the heaters of each of said switches in sequence, each i'th one of said pulses except a first one of said pulses beginning at a respective time $T_i$ after the beginning of the immediately preceding pulse, each i'th one of said pulses having a respective pulse width which is shorter than $T_{(i+1)}/2$.

26. A method for controlling a first thermo-optic switch for temporary deflection of optical energy out of a first optical path, said first thermo-optic switch having a heater and further having a deflection efficiency which changes in response to electrical energy delivered to said heater, comprising the steps of:
  delivering initial electrical energy to said heater, said initial electrical energy having an average amplitude;
  terminating delivery of said initial electrical energy to said heater, said initial electrical energy thereby having a delivery duration, said step of terminating occurring before the change in deflection efficiency of said first thermo-optic switch exceeds 90% of the maximum change in deflection efficiency produced in response to said initial electrical energy, for more than one-half said delivery duration; and thereafter
  delivering sustaining electrical energy to said heater over a sustaining time period immediately following said step of terminating, said sustaining electrical energy having an average amplitude which is lower than the average amplitude of said initial electrical energy.

27. A method according to claim 26, wherein said first thermo-optic switch further has a diffusion time given by the length of time for the deflection efficiency of said switch to reach a maximum change in response to an impulse of electrical energy delivered to said heater, wherein said step of terminating delivery of said initial electrical energy to said heater comprises the step of terminating delivery of said initial electrical energy to said heater within a time period after said initial electrical energy begins being applied to said heater which is shorter than twice the diffusion time of said first thermo-optic switch.

28. A method according to claim 26, wherein optical energy deflected out of said first optical path is directed into a second optical path.

29. A method according to claim 26, wherein optical energy deflected out of said first optical path is directed toward a pixel of a display.

30. A method according to claim 26, wherein said initial electrical energy has a constant amplitude.

31. A method according to claim 26, wherein said initial electrical energy has a rise time and a fall time which is longer than said rise time.

32. A method according to claim 31, wherein said initial electrical energy has an exponential decay.

33. A method according to claim 26, wherein the deflection efficiency of said first thermo-optic switch increases in response to electrical energy delivered to said heater.

34. A method according to claim 33, for controlling a plurality of thermo-optic switches along said first optical path including said first thermo-optic switch, each of said thermo-optic switches having a respective heater and further having a respective deflection efficiency which increases in response to electrical energy delivered to the respective heater, comprising the steps of:

delivering to each of said heaters in sequence, respective initial electrical energy having a respective average amplitude;

terminating delivery of each respective initial electrical energy to the respective heater, the initial electrical energy delivered to each of said heaters thereby having a respective delivery duration, said step of terminating occurring with respect to the heaters of each of said thermo-optic switches before the change in deflection efficiency of the respective thermo-optic switch exceeds 90% of the maximum change in deflection efficiency produced in response to said initial electrical energy delivered to the respective switch, for more than one-half the respective delivery duration; and thereafter delivering to each of said heaters respective sustaining electrical energy over a respective sustaining time period following the termination of the respective initial electrical energy to the respective heater in said step of terminating, each respective sustaining electrical energy having a respective average amplitude which is lower than the average amplitude of the respective initial electrical energy.

35. A method according to claim 33, wherein said sustaining electrical energy has a constant amplitude over said sustaining time period.

36. A method according to claim 33, wherein said sustaining electrical energy has an amplitude which varies over said sustaining period.

37. A method according to claim 36, wherein said step of delivering sustaining electrical energy to said heater over a sustaining time period following said step of terminating, comprises the step of delivering a plurality of sustaining electrical energy pulses to said heater over said sustaining time period.

38. A method according to claim 33, wherein said step of delivering sustaining electrical energy to said heater over a sustaining time period following said step of terminating comprises the step of delivering sufficient energy to said heater during said sustaining time period to maintain the deflection efficiency change of said first thermo-optic switch at at least said maximum change, at least until said sustaining time period ends.

39. A method according to claim 38, wherein the deflection efficiency of said first thermo-optic switch saturates at a deflection efficiency corresponding to a saturation deflection efficiency change, and wherein said maximum change in deflection efficiency produced in response to said initial electrical energy is equal to said saturation deflection efficiency change.

40. A method according to claim 38, wherein the deflection efficiency of said first thermo-optic switch saturates at a deflection efficiency corresponding to a saturation deflection efficiency change, and wherein said maximum change in deflection efficiency produced in response to said initial electrical energy is smaller than said saturation deflection efficiency change.

41. A method according to claim 26, wherein said step of delivering sustaining electrical energy to said heater over a sustaining time period following said step of terminating, comprises the step of delivering energy to said heater during said sustaining time period with an amplitude profile which maintains the deflection efficiency change of said first thermo-optic switch at said maximum change, at least until said sustaining time period ends.

42. A method according to claim 26, wherein said initial electrical energy is delivered over an initial time period, and wherein said sustaining time period is longer than said initial time period.

43. A method according to claim 26, further comprising the step of charging an energy storage element prior to said step of delivering initial electrical energy to said heater, and wherein said step of delivering initial electrical energy to said heater comprises the step of delivering energy from said energy storage element at least partly to said heater.

44. A method according to claim 43, wherein said step of delivering sustaining electrical energy to said heater over a sustaining time period following said step of terminating comprises the step of connecting a constant amplitude energy source to said heater during said sustaining time period.

45. A method according to claim 26, further comprising the step of repeating, at constant time intervals, said steps of delivering initial electrical energy to said heater, terminating delivery of said initial electrical energy to said heater, and delivering sustaining electrical energy to said heater.

46. Thermo-optic switching apparatus comprising:

a first thermo-optic switch disposed along a first optical path, said first thermo-optic switch having a heater and further having a deflection efficiency which changes in response to electrical energy delivered to said heater; and a driver which delivers an electrical energy pulse to said heater, said pulse having a pulse width which is shorter than 90% of the response time with which said deflection efficiency reaches a maximum change after said pulse begins being applied to said heater.

47. Thermo-optic switching apparatus comprising:
a first thermo-optic switch disposed along a first optical path, said first thermo-optic switch having a heater and further having a deflection efficiency which changes in response to electrical energy delivered to said heater; and
a driver which delivers an electrical energy pulse to said heater, said pulse having a pulse width which is measurably shorter than the response time with which said deflection efficiency reaches a maximum change after said pulse begins being applied to said heater.

48. Apparatus according to claim 47, wherein the deflection efficiency of said first thermo-optic switch increases in response to electrical energy delivered to said heater.

49. Thermo-optic switching apparatus comprising:
a first thermo-optic switch disposed along a first optical path, said first thermo-optic switch having a heater and further having a deflection efficiency which changes in response to electrical energy delivered to said heater, said first thermo-optic switch further having a diffusion time given by the length of time for the deflection efficiency of said switch to reach a maximum change in response to an impulse of electrical energy delivered to said heater; and
a driver which delivers an electrical energy pulse to said heater, said pulse having a pulse width which is shorter than twice the diffusion time of said first thermo-optic switch.

50. Apparatus according to claim 49, wherein the deflection efficiency of said first thermo-optic switch increases in response to electrical energy delivered to said heater.

51. Apparatus according to claim 49, further comprising a display pixel, wherein optical energy deflected out of said first optical path is directed toward said display pixel.

52. A method according to claim 49, wherein said pulse delivered by said driver has a pulse rise time and a pulse fall time which is longer than said pulse rise time.

53. Apparatus according to claim 49, wherein said driver comprises:
a pulse generator which outputs a plurality of said electrical energy pulses in sequence; and
a first electrical switch which couples only a first proper subset of said pulses to said heater.

54. Apparatus according to claim 53, further comprising a second thermo-optic switch disposed along said first optical path, said second thermo-optic switch having a heater,
wherein said driver further comprises a second electrical switch which couples only a second proper subset of said pulses to the heater of said second thermo-optic switch, the pulses in said second subset alternating with the pulses in said first subset.

55. Apparatus according to claim 54, further comprising a third thermo-optic switch disposed along said first optical path, said third thermo-optic switch having a heater,
wherein said driver further comprises a third electrical switch which couples only a third proper subset of said pulses to the heater of said third thermo-optic switch, the pulses in said first, second and third subsets following each other in round robin sequence.

56. A method according to claim 49, wherein said heater comprises a plurality of heater segments.

57. Thermo-optic switching apparatus comprising:
a first thermo-optic switch disposed along a first optical path, said first thermo-optic switch having a heater and further having a deflection efficiency which changes in response to electrical energy delivered to said heater, said first thermo-optic switch further having an impulse response rise time given by the length of time for the deflection efficiency of said switch to change from 10% to 90% of its maximum change in response to an impulse of electrical energy delivered to said heater; and
a driver which delivers an electrical energy pulse to said heater, said pulse having a pulse width which is shorter than four times the impulse response rise time of said first thermo-optic switch.

58. Thermo-optic switching apparatus comprising:
a first thermo-optic switch disposed along a first optical path, said first thermo-optic switch having a heater and further having a deflection efficiency which changes in response to electrical energy delivered to said heater; and
a driver which delivers an electrical energy pulse to said heater, said pulse having a pulse width which is shorter than 50 $\mu s$.

59. Display apparatus comprising:
a first plurality of thermo-optic switches along a first optical path, each of said switches in said first plurality of switches having a respective heater and deflecting optical energy out of said first optical path in response to electrical energy delivered to said heater, each of said switches in said first plurality of switches having a respective deflection efficiency; and
a driver which delivers electrical energy pulses to the heaters of selected ones of said switches in sequence, each i'th one of said pulses except a first one of said pulses beginning at a respective time $T_i$ after the beginning of the immediately preceding pulse, each i'th one of said pulses having a respective pulse width which is sufficiently short to cause the deflection efficiency change of the respective switch to increase from 10% to 90% of its maximum change in response to the respective pulse, within a time period of $T_{(i+1)}/2$.

60. Apparatus according to claim 59, wherein optical energy deflected out of said first optical path by each of the switches in said first plurality of switches is directed toward a respective pixel of said display.

61. Apparatus according to claim 59, wherein each of said pulses is rectangular.

62. Apparatus according to claim 59, wherein the pulses delivered to one of the switches in said first plurality of switches has pulses has a pulse rise time and a pulse fall time which is longer than said pulse rise time.

63. Apparatus according to claim 62, wherein said pulses delivered to said one of the switches in said first plurality of switches an exponential decay.

64. Apparatus according to claim 59, wherein each of said electrical energy pulses has a respective average amplitude,
wherein immediately after said driver finishes delivering the electrical energy pulse to each given one of said heaters, said driver further delivers sustaining energy to the given heater, the sustaining energy delivered to each given one of said heaters lasting for a respective period of time which is longer than the width of the respective electrical energy pulse delivered to the given heater and having an average amplitude which is smaller than said average amplitude of the respective electrical energy pulse delivered to the given heater.

65. Apparatus according to claim 59, wherein each of said heaters comprises a plurality of heater segments.

66. Apparatus according to claim 59, further comprising a second plurality of thermo-optic switches along a second optical path, each of the switches in said second plurality of switches having a respective heater; and electrical connections among the heaters in said first and second pluralities of switches such that electrical energy delivered to each heater in said first plurality of switches is also delivered to a respective corresponding heater in said second plurality of switches.

67. Display apparatus comprising:

a first plurality of thermo-optic switches along a first optical path, each of said switches in said first plurality of switches having a respective heater and deflecting optical energy out of said first optical path in response to electrical energy delivered to said heater, each of said switches in said first plurality of switches having a respective deflection efficiency; and a driver which delivers electrical energy pulses to the heaters of selected ones of said switches in sequence, each i'th one of said pulses except a first one of said pulses beginning at a respective time $T_i$ after the beginning of the immediately preceding pulse, each i'th one of said pulses having a respective pulse width which is shorter than $T_{(i+1)}/2$.

* * * * *